United States Patent
Yang et al.

(10) Patent No.: US 11,828,939 B2
(45) Date of Patent: *Nov. 28, 2023

(54) METHOD AND APPARATUS FOR ADJUSTING MOTION-BASED DATA SPACE MANIPULATION

(71) Applicant: WEST TEXAS TECHNOLOGY PARTNERS, LLC, Waco, TX (US)

(72) Inventors: Allen Yang Yang, Richmond, CA (US); Sleiman Itani, East Palo Alto, CA (US)

(73) Assignee: West Texas Technology Partners, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/221,749

(22) Filed: Apr. 2, 2021

(65) Prior Publication Data

US 2021/0223547 A1 Jul. 22, 2021

Related U.S. Application Data

(63) Continuation of application No. 14/667,550, filed on Mar. 24, 2015, now Pat. No. 10,996,473.

(60) Provisional application No. 61/970,811, filed on Mar. 26, 2014.

(51) Int. Cl.
- *G02B 27/01* (2006.01)
- *G06T 19/00* (2011.01)
- *G02B 27/00* (2006.01)
- *G06F 3/01* (2006.01)

(52) U.S. Cl.
CPC ....... *G02B 27/017* (2013.01); *G02B 27/0093* (2013.01); *G06F 3/011* (2013.01); *G06T 19/006* (2013.01); *G02B 2027/0187* (2013.01)

(58) Field of Classification Search
CPC ........ G02B 2027/0187; G02B 27/0093; G02B 27/017; G02B 27/0179; G02B 27/0172; G06F 3/0346; G06F 3/011; G06T 19/006
See application file for complete search history.

(56) References Cited

U.S. PATENT DOCUMENTS

| | | | |
|---|---|---|---|
| 7,128,705 B2 | 10/2006 | Brendley et al. | |
| 7,312,766 B1 * | 12/2007 | Edwards | H04N 5/23293 359/630 |
| 8,947,323 B1 | 2/2015 | Raffle et al. | |
| 9,370,302 B2 | 6/2016 | Krueger | |

(Continued)

*Primary Examiner* — Jin Cheng Wang
(74) *Attorney, Agent, or Firm* — Cadwalader, Wickersham & Taft LLP

(57) ABSTRACT

A data space such as a virtual/augmented reality environment is generated, through which a viewer/point of view may move. The physical world motion of a display outputting the data space is sensed, received, or computed. The motion of a physical world environment in which the display also is sensed, received, or computed. An output adjustment is determined from the display and environment motions, typically being equal to the environment motion(s). Motion of a point of view within the data space to be outputted by the display is determined. The viewpoint motion corresponds with the display motion within physical space adjusted by the output adjustment. At least part of the data space is outputted to the display from the point of view. The point of view is navigated through the data space according to the viewpoint motion.

19 Claims, 14 Drawing Sheets

(56) References Cited

U.S. PATENT DOCUMENTS

| | | | |
|---|---|---|---|
| 9,547,173 B2* | 1/2017 | Alaniz | G02B 27/017 |
| 10,996,473 B2* | 5/2021 | Yang | G02B 27/0093 |
| 2010/0066832 A1 | 3/2010 | Nagahara et al. | |
| 2010/0141555 A1* | 6/2010 | Rorberg | H04N 5/772 |
| | | | 348/241 |
| 2012/0134543 A1 | 5/2012 | Fedorovskaya et al. | |
| 2012/0182206 A1* | 7/2012 | Cok | G02B 27/017 |
| | | | 345/8 |
| 2013/0235169 A1 | 4/2013 | Kato et al. | |
| 2013/0169679 A1 | 7/2013 | Su et al. | |
| 2013/0278631 A1* | 10/2013 | Border | G06Q 30/02 |
| | | | 345/633 |
| 2013/0293447 A1 | 11/2013 | Bickerstaff et al. | |
| 2013/0336629 A1* | 12/2013 | Mulholland | G02B 27/0093 |
| | | | 386/230 |
| 2014/0022279 A1 | 1/2014 | Tasaki et al. | |
| 2014/0098008 A1* | 4/2014 | Hatton | G06T 11/00 |
| | | | 345/8 |
| 2014/0176296 A1* | 6/2014 | Morgan | G06F 3/011 |
| | | | 340/4.13 |
| 2014/0362113 A1 | 12/2014 | Benson et al. | |
| 2015/0068052 A1 | 3/2015 | Krueger | |
| 2015/0081170 A1 | 3/2015 | Kikuchi | |
| 2015/0097860 A1 | 4/2015 | Alaniz et al. | |
| 2015/0175068 A1 | 6/2015 | Szostak et al. | |
| 2016/0209648 A1* | 7/2016 | Haddick | G04G 21/025 |
| 2016/0371813 A1 | 12/2016 | Fujie | |
| 2017/0009843 A1 | 1/2017 | Weng | |
| 2017/0344114 A1 | 11/2017 | Osterhout et al. | |

* cited by examiner

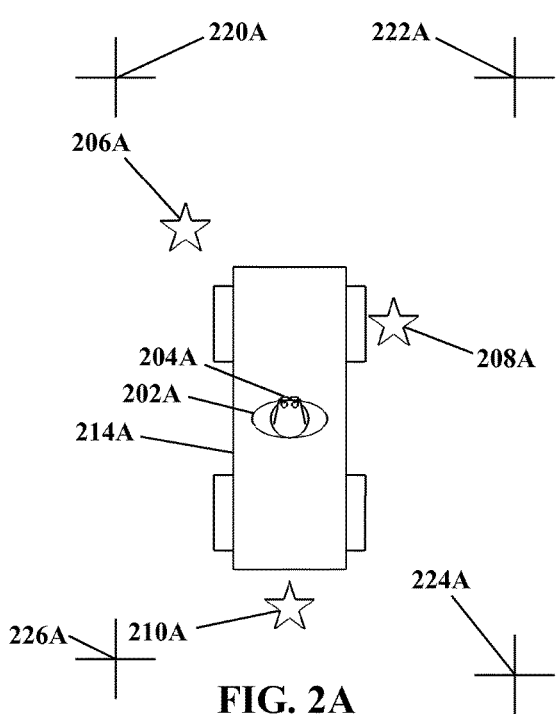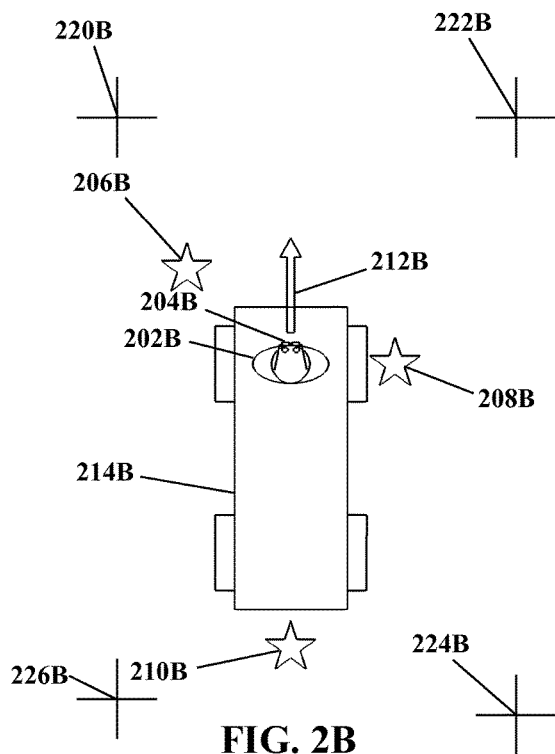
FIG. 2A  FIG. 2B
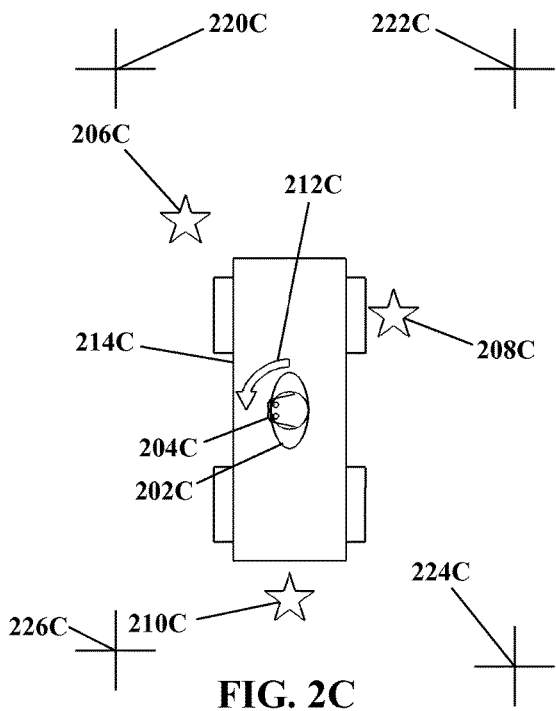
FIG. 2C

METHOD AND APPARATUS FOR ADJUSTING MOTION-BASED DATA SPACE MANIPULATION

CROSS-REFERENCES

This application is a Continuation of U.S. non-provisional patent application Ser. No. 14/667,550 filed Mar. 24, 2015, which claims the benefit of U.S. Provisional application No. 61/970,811 filed Mar. 26, 2014, the entire contents of which are incorporated herein in their entirety.

FIELD OF THE INVENTION

The present invention relates to manipulation of and interaction with data spaces. More particularly, the present invention relates to motion within a data space that supports navigation therein based on motions within the physical world, and to controlling which physical world motions produce motions within the data space.

DESCRIPTION OF RELATED ART

Certain data spaces, including but not limited to virtual reality and augmented reality data spaces, enable motion within the data spaces and/or manipulation of the data spaces by motions and/or manipulations within the physical world. For example, moving forward in the physical world might cause a viewpoint (such as an avatar, a visual field, etc.) within a data space to move in a corresponding fashion, i.e. the viewpoint would move forward through the data space. Similarly, rotation in the physical world may produce corresponding rotation within the data space, etc.

However, not all motions in the physical world necessarily are carried out as deliberate commands for motion in the data world. Sensing all motion within the physical world, and transforming all such motion within the physical world into corresponding motion within the data world, may not be desirable in all cases.

BRIEF SUMMARY OF THE INVENTION

The present invention contemplates a variety of systems, apparatus, methods, and paradigms for adjusting the transformation of motion in the physical world into motion in a data space.

In one embodiment of the present invention, a machine-implemented method is provided that includes generating a data space, establishing a display motion of a display within a physical world space, the display being adapted to output at least a portion of the data space, and establishing an environment motion of an environment within the physical world space, the display being disposed in the environment so as to be movable therewith. The method also includes determining an output adjustment, the output adjustment including the environment motion, determining a viewpoint motion of a point of view within the data space substantially corresponding with a combination of the display motion within the physical world space as adjusted by the output adjustment, outputting with the display at least a portion of the data space from the point of view, and navigating the point of view within the data space at least substantially in accordance with the viewpoint motion.

The data space may be a three dimensional data space. The data space may be an augmented reality space and/or a virtual reality space. The display motion may include translation and/or rotation.

Establishing the display motion may include sensing the display motion with a sensor, and communicating the display motion to the processor. Establishing the display motion may include sensing the display motion with a sensor substantially rigidly engaged with the display, and communicating the display motion to the processor. Establishing the display motion may include receiving the display motion via a communicator in communication with the processor. Establishing the display motion may include computationally determining the display motion in the processor.

The display motion may include an induced term substantially corresponding with motion induced by the environment motion.

The display may be a wearable display. The display may be a head mounted display.

The environment may be a vehicle, and the environment motion may include a vehicle motion of the vehicle, the display being disposed within the vehicle.

Establishing the environment motion may include sensing the environment motion with a sensor and communicating the environment motion to the processor. Establishing the environment motion may include sensing the environment motion with a sensor substantially rigidly engaged with the environment, and communicating the environment motion to the processor. Establishing the environment motion may include receiving the environment motion from a communicator in communication with the processor. Establishing the environmental motion may include computationally determining the environment motion in the processor.

The output adjustment may include a damping term, the damping term substantially corresponding to a damping of the environment motion. The damping term may substantially correspond with damped harmonic motion. The output adjustment may substantially equal the environment motion. Determining the viewpoint motion may include subtracting the output adjustment from the display motion.

The point of view may include a stereo point of view.

The method may include establishing multiple environment motions of at least one environment within the physical world space, the display being disposed in the environments so as to be movable therewith, and determining an output adjustment including a combination of the environment motions.

In another embodiment of the present invention, a method is provided that includes generating an augmented reality space, sensing a first display motion of a head mounted display within a physical world space via a display motion sensor substantially rigidly engaged with the head mounted display, the head mounted display being adapted to output at least a portion of the augmented reality space, and disposing the head mounted display moveably within a vehicle. The method includes sensing a first environment motion of said vehicle within the physical world space via an environment motion sensor substantially rigidly engaged with the vehicle, computationally determining a second display motion substantially corresponding to an induction from the first environment motion, and computationally determining a second environment motion substantially corresponding to a damping of the first environment motion. The method further includes determining an output adjustment comprising the second display motion, the first environment motion, and the second environment motion, determining a viewpoint motion of a point of view within the augmented reality space including the display motion within the physical world space as adjusted by the output adjustment, outputting with the display at least a portion of the augmented reality space from the point of view, and navigating the point of view within the data space at least substantially in accordance with the viewpoint motion.

In another embodiment of the present invention, an apparatus is provided that includes a processor, a display in communication with the processor, a display motion sensor in communication with the processor and/or a communicator in communication with the processor, and an environment motion sensor in communication with the processor and/or the communicator. The apparatus also includes a data space generator including executable instructions instantiated on the processor adapted to generate a data space, a display motion establisher including executable instructions instantiated on the processor adapted to establish a display motion within a physical world space from the display motion sensor and/or the receiver, and an environment motion establisher including executable instructions instantiated on the processor adapted to establish an environment motion within the physical world space from the environment motion sensor and/or the receiver. The apparatus further includes an output adjustment determiner including executable instructions instantiated on the processor adapted to determine an output adjustment including the environment motion, a viewpoint motion determiner including executable instructions instantiated on the processor adapted to determine a viewpoint motion of a point of view within the data space including the display motion within the physical world as adjusted by the output adjustment. The apparatus also includes and a data space outputter including executable instructions instantiated on the processor adapted to output at least a portion of the data space from the point of view to the display, and a data space navigator including executable instructions instantiated on the processor adapted to navigate the point of view within the data space at least substantially in accordance with the viewpoint motion.

The apparatus may include a computational motion determiner including executable instructions instantiated on the processor, adapted to determine computationally a second display motion and/or a second environment motion.

The display may be a stereo display. The display may be a head mounted display. The processor, display, display motion sensor, environment motion sensor, and/or communicator may be physically integrated as a wearable device.

The display motion sensor may be physically distal from the display. The environment motion sensor may be physically distal from the display.

The display motion sensor may include an accelerometer, a gyroscope, a GPS sensor, a magnetometer, an imager, a depth sensor, a structured light sensor, a time-of-flight sensor, an ultrasonic sensor, and/or a wireless signal triangulation sensor.

The environment motion sensor may include an accelerometer, a gyroscope, a GPS sensor, a magnetometer, an imager, a depth sensor, a structured light sensor, a time-of-flight sensor, an ultrasonic sensor, and/or a wireless signal triangulation sensor.

In another embodiment of the present invention, an apparatus is provided that includes means for generating a data space, means for establishing a display motion of a display within a physical world space, the display being adapted to output at least a portion of the data space, and means for establishing an environment motion of an environment within the physical world space, the display being disposed in the environment so as to be movable therewith. The apparatus also includes means for determining an output adjustment, the output adjustment including the environment motion, means for determining a viewpoint motion of a point of view within the data space, the viewpoint motion including motion within the data space substantially corresponding with a combination of the display motion within the physical world space and the output adjustment, and means for outputting with the display at least a portion of the data space from the point of view.

BRIEF DESCRIPTION OF THE SEVERAL VIEWS OF THE DRAWINGS

Like reference numbers generally indicate corresponding elements in the figures.

FIG. 2A through FIG. 2C show examples of viewer motions within an environment in the physical world that are transformed into substantially corresponding motions in a data world.

DETAILED DESCRIPTION OF THE INVENTION

Figure 1A:
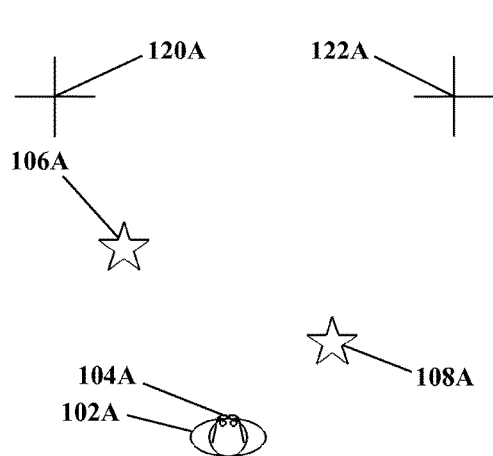
FIG. 1A through FIG. 1C show examples of physical world viewer motions that are transformed into substantially corresponding motions in a data world.

With reference to FIG. 1A, therein is shown a top-down view of a viewer 102A with a display 104A. As illustrated, the display 104A is a stereo head mounted display worn by the viewer 102A, however this is an example only and other displays (wearable or otherwise) and other arrangements may be equally suitable.

Cross-shaped registration marks 120A, 122A, 124A, and 126A are shown to represent a substantially fixed frame of reference in the physical world. When the viewer 102A, display 104A, etc. are shown to move with respect to registration marks 120A, 122A, 124A, and 126A it should be understood as being motion within the physical world, compared to that substantially fixed frame of reference.

Data content 106A, 108A, and 110A also is shown in FIG. 1A to represent a frame of reference for a data space. The data content 106A, 108A, and 110A is illustrated as stars distributed throughout the data space, however this is an example only, and data content 106A, 108A, and 110A might include (but is not limited to) text, images, animations, etc.

Although the arrangement shown in FIG. 1A (and likewise in similar figures herein) is two dimensional, the present invention is not limited only to two dimensional spaces or to functioning in two dimensions. Notably, three dimensional data spaces may be equally suitable.

As may be seen in FIG. 1A, the viewer 102A and the display 104A are disposed in physical space as represented by registration marks 120A, 122A, 124A, and 126A, and also are disposed (or for certain embodiments a point of view thereof is disposed) within the data space as represented by data content 106A, 108A, and 110A.

Figure 1B:
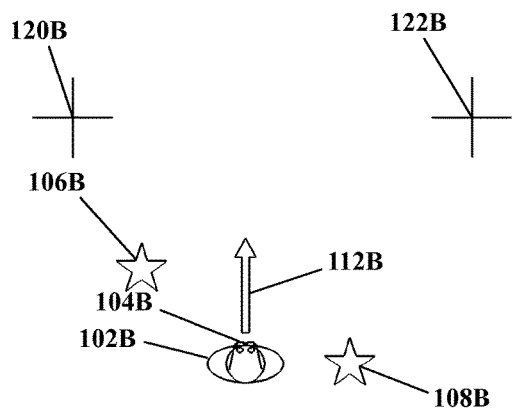

Turning to FIG. 1B, therein another arrangement at least somewhat similar to that of FIG. 1A is shown. A viewer 102B with a display 104B is shown, disposed within both the physical world as indicated by registration marks 120B, 122B, 124B, and 126B and a data space as represented by data content 106B, 108B, and 110B.

However, as may be observed through comparison with FIG. 1A, in FIG. 1B the viewer 102B and display 104B have translated forward by some distance within the physical world (as may be seen from the relative position of viewer 102B and display 104B to the registration marks 120B, 122B, 124B, and 126B), and likewise within the data space (as may be seen from the relative position of viewer 102B and display 104B to the data content 106B, 108B, and 110B). The motion is indicated by a vector 112B indicating approximate direction and magnitude of the translation; it is noted that both direction and magnitude are approximate and are not necessarily perfectly to scale, and that the vector is shown for illustrative purposes.

As an aside, it should be understood that although the viewer 102B and/or the display 104B are sometimes referred to herein as "being in" or "moving within" the data space, this is a linguistic convention. In practice a physical person or object typically is not considered to be present within a data space in a strict physical sense, and indeed a data space may not have any physical substance to support physical presence. Rather, motion within a data space may be considered as representing motion of a data construct such as a virtual or augmented reality avatar, motion of a point of view used for outputting data to the display 104B so as to make the data space visible, etc. In addition, it should be understood that moving within a data space may, for at least certain data spaces, be functionally equivalent to moving the data space with respect to the viewer, or otherwise producing an effect that is similar in experience to a motion within a space. Regardless of whether a data space is in the strictest sense truly a "space", whether motion within a data space is in the strictest sense truly "motion", etc., data spaces may be sufficiently analogous with physical spaces as to support the use of such terms. (Indeed, data spaces sometimes may be constructed deliberately so be analogous to physical spaces, in order to take advantage of human experience in interacting with physical spaces and enable that expertise to be applied to data manipulation.)

Figure 1C:
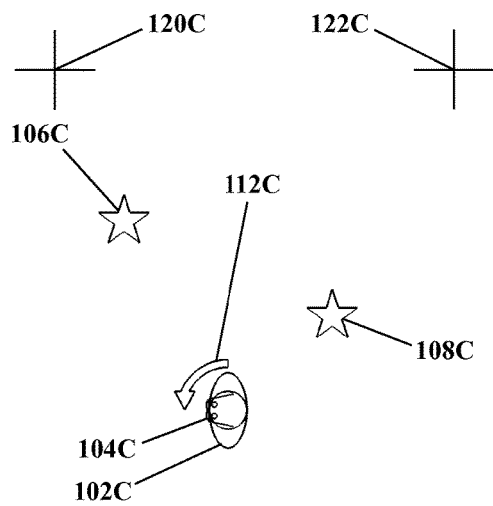

Turning now to FIG. 1C, therein another arrangement also at least somewhat similar to that of FIG. 1A is shown. A viewer 102C with a display 104C is shown, disposed within both the physical world as indicated by registration marks 120C, 122C, 124C, and 126C and a data space as represented by data content 106C, 108C, and 110C.

As again may be observed through comparison with FIG. 1A, in FIG. 1C the viewer 102C and display 104C have rotated counterclockwise within the physical world, and likewise within the data space. The motion is indicated by a vector 112C indicating approximate direction and magnitude of the rotation (about 90 degrees as shown, though this is an example only); it is again noted that both direction and magnitude are approximate and are not necessarily perfectly to scale, and that the vector is shown for illustrative purposes.

As may be seen in FIG. 1B and FIG. 1C as compared with FIG. 1A, the motions in physical space shown therein are converted to substantially corresponding motions in data space. Motions in physical space are converted to motions in data space of similar direction and magnitude, without substantial portions of the motions being excluded, motions being substantially modified, etc. That is, in the example of FIG. 1A through FIG. 1C substantially all physical space motion produces corresponding data space motion.

Now with reference to FIG. 2A, a viewer 202A with a display 204A is shown, disposed within both the physical world as indicated by registration marks 220A, 222A, 224A, and 226A and a data space as represented by data content 206A, 208A, and 210A.

In addition, a vehicle 214A is shown with the viewer 202A and the display 204A disposed therein. As illustrated the vehicle 214A is a wheeled motor vehicle such as a bus, but this is an example only and other vehicles including but not limited to cars, trucks, trains, aircraft, bicycles, skateboards, etc. may be equally suitable. In addition, although the viewer 202A and display 204A are shown to be literally within the vehicle 214A in FIG. 2A, this is not required so long as the viewer 202A and display 204A are engaged with the vehicle so as to be movable substantially therewith. That is, a viewer 202A on a motorcycle might not be "within" the motorcycle in a strict sense, but nevertheless the example of FIG. 2A (and subsequent figures herein, unless otherwise specified) would nevertheless apply thereto.

With reference to FIG. 2B, a viewer 202B with a display 204B is shown, disposed within both the physical world as indicated by registration marks 220B, 222B, 224B, and 226B and a data space as represented by data content 206B, 208B, and 210B. A vehicle 214B also is shown with the viewer 202B and display 204B disposed therein.

As may be observed through comparison with FIG. 2A, in FIG. 2B the viewer 202B and display 204B have translated forward within the physical world and likewise within the data space. The motion is indicated by a vector 212B indicating approximate direction and magnitude of the translation. It is noted that the vehicle 214B in which the viewer 202B and display 204B are disposed has not moved within the physical world. Thus, the effective motion of the viewer 202B and the display 204B within the physical world is also substantially equal to the motion of the viewer 202B and the display 204B with respect to the vehicle 214B. That is, the vehicle 214B does not contribute to the total motion of the viewer 202B and the display 204B within the physical world. Consequently, converting all motion of the viewer 202B and the display 204B in the physical world into corresponding motion in the data world produces motion in the data world that is substantially similar to that as would occur if the viewer 202B and the display 204B were not in a vehicle 214B (so long as the vehicle 214B is substantially stationary as shown).

Now with reference to FIG. 2C, a viewer 202C with a display 204C is shown, disposed within both the physical world as indicated by registration marks 220C, 222C, 224C, and 226C and a data space as represented by data content 206C, 208C, and 210C. A vehicle 214C also is shown with the viewer 202C and display 204C disposed therein.

As may be observed through comparison with FIG. 2A, in FIG. 2C the viewer 202C and display 204C have rotated counterclockwise within the physical world and likewise within the data space. The motion is indicated by a vector 212C indicating approximate direction and magnitude of the rotation. It is noted that the vehicle 214C in which the viewer 202C and display 204C are disposed has not moved within the physical world. Thus, the effective motion of the viewer 202C and the display 204C within the physical world is also substantially equal to the motion of the viewer 202C and the display 204C with respect to the vehicle 214C. That is, the vehicle 214C does not contribute to the total motion of the viewer 202C and the display 204C within the physical world. Consequently, converting all motion of the viewer 202C and the display 204C in the physical world into corresponding motion in the data world produces motion in the data world that is substantially similar to that as would occur if the viewer 202C and the display 204C were not in a vehicle 214C (so long as the vehicle 214C is substantially stationary as shown).

As may be seen in FIG. 2B and FIG. 2C as compared with FIG. 2A, the motions in physical space shown therein are converted to substantially corresponding motions in data space, regardless of the fact that the viewer and display are in a vehicle and thus is subdivided from the larger physical world and potentially mobile. As with FIG. 1A through FIG. 1C, in FIG. 2A through FIG. 2C motions in physical space are converted to motions in data space of similar direction and magnitude, without substantial portions of the motions being excluded, motions being substantially modified, etc. In the example of FIG. 1A through FIG. 1C substantially all physical space motion produces corresponding data space motion.

Figure 3A:
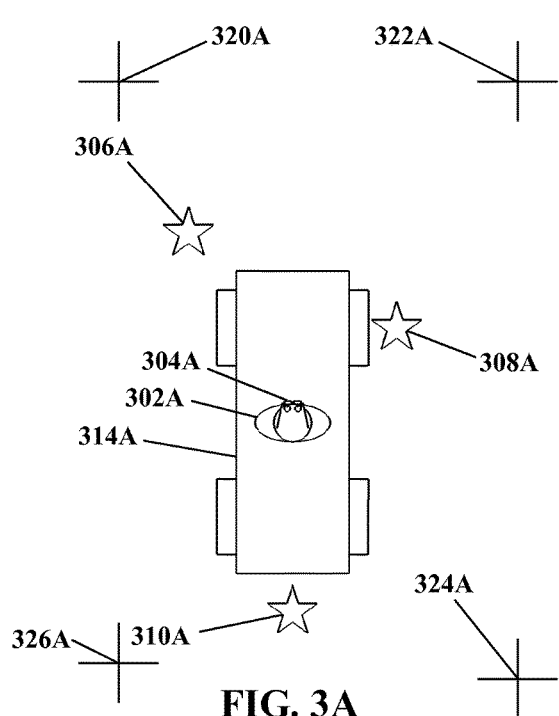
FIG. 3A through FIG. 3C show examples of viewer motions within an environment in the physical world that are transformed into substantially corresponding motions in a data world, wherein the environment also may be moving.

Now with reference to FIG. 3A, a viewer 302A with a display 304A is shown, disposed within both the physical world as indicated by registration marks 320A, 322A, 324A, and 326A and a data space as represented by data content 306A, 308A, and 310A. In addition, a vehicle 314A is shown with the viewer 302A and the display 304A disposed therein.

Figure 3B:
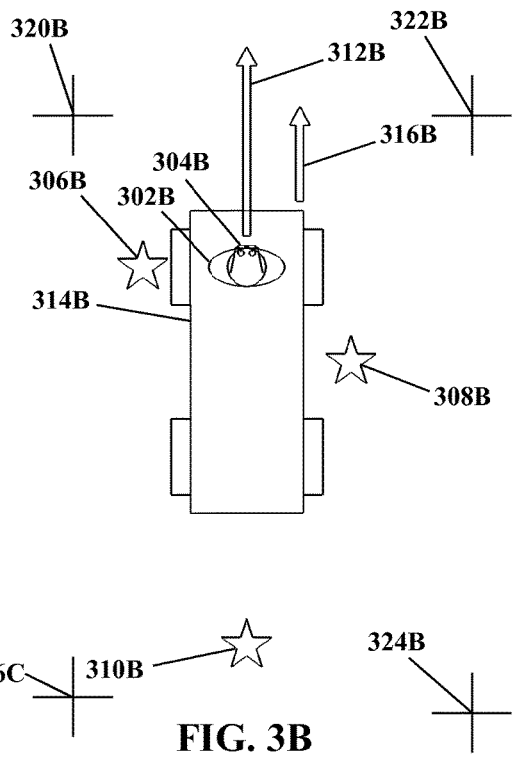

With reference to FIG. 3B, a viewer 302B with a display 304B is shown, disposed within both the physical world as indicated by registration marks 320B, 322B, 324B, and 326B and a data space as represented by data content 306B, 308B, and 310B. A vehicle 314B also is shown with the viewer 302B and display 304B disposed therein.

As may be observed through comparison with FIG. 3A, in FIG. 3B the viewer 302B and display 304B have translated forward within the physical world. The motion is indicated by a vector 312B indicating approximate direction and magnitude of the translation in physical space.

In addition, the vehicle 314B also has translated forward within the physical world. The motion of the vehicle is indicated by a vector 316B indicating approximate direction and magnitude of the translation.

Note that vector 312B represents the total translation, not just the translation of the viewer 302B and display 304B within the vehicle 314B. By contrast, vector 316B represents only the translation of the vehicle 314B.

As may be seen from the change in position of the viewer 302B and display 304B with respect to content 306B, 308B, and 310B and with respect to registration marks 320B, 322B, 324B, and 326B, the effective motion of the viewer 302B and the display 304B within the physical world is substantially equal to the sum of the motion of the viewer 302B and display 304B with respect to the vehicle 314B and the motion of the vehicle 314B with respect to the physical world. This is the translation represented by vector 312B.

In addition, similar magnitudes and directions of motion may be seen in FIG. 3B with respect to the data space (e.g. by comparison of positions relative to content 306B, 308B, and 310B). That is, the motion of the vehicle 314B contributes to the motion of the viewer 302B and 304B within the data space. Thus the personal motion of the viewer 302B in the physical world is not the only factor affecting the motion of the viewer 302B within the data space.

Figure 3C:
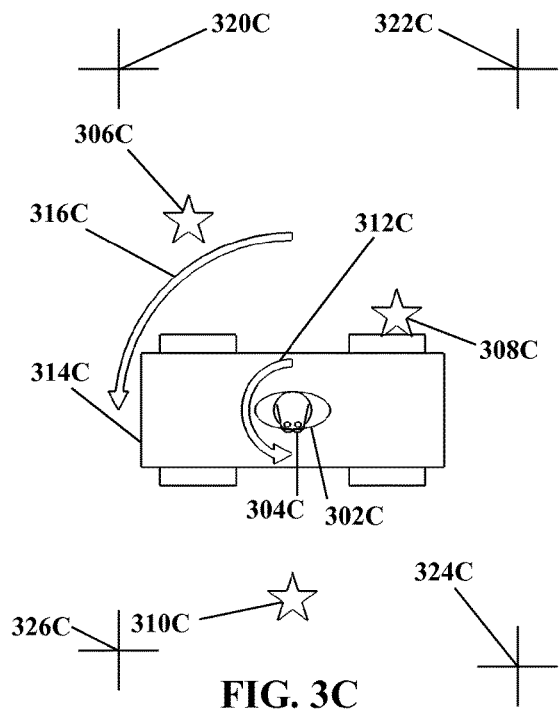

Now with reference to FIG. 3C, a viewer 302C with a display 304C is shown, disposed within both the physical world as indicated by registration marks 320C, 322C, 324C, and 326C and a data space as represented by data content 306C, 308C, and 310C. A vehicle 314C also is shown with the viewer 302C and display 304C disposed therein.

As may be observed through comparison with FIG. 3A, in FIG. 3C the viewer 302C and display 304C have rotated counterclockwise within the physical world. The motion is indicated by a vector 312C indicating approximate direction and magnitude of the rotation.

In addition, the vehicle 314C also has rotated counterclockwise within the physical world. The motion of the vehicle is indicated by a vector 316C indicating approximate direction and magnitude of the rotation.

Note that vector 312C represents the total rotation, not just the rotation of the viewer 302C and display 304C within the vehicle 314C. By contrast, vector 316C represents only the rotation of the vehicle 314C.

As may be seen from the change in position of the viewer 302C and display 304C with respect to content 306C, 308C, and 310C and with respect to registration marks 320C, 322C, 324C, and 326C, the effective motion of the viewer 302C and the display 304C within the physical world is substantially equal to the sum of the motion of the viewer 302C and display 304C with respect to the vehicle 314C and the motion of the vehicle 314C with respect to the physical world. This is the rotation represented by vector 312C.

In addition, similar magnitudes and directions of motion may be seen in FIG. 3C with respect to the data space (e.g. by comparison of positions relative to content 306C, 308C, and 310C). That is, the motion of the vehicle 314C contributes to the motion of the viewer 302C and 304C within the data space. Thus the personal motion of the viewer 302C in the physical world is not the only factor affecting the motion of the viewer 302C within the data space.

As may be seen in FIG. 3B and FIG. 3C as compared with FIG. 3A, substantially all of the motions in physical space shown therein (or considered differently, the total motion in physical space) are converted to substantially corresponding motions in data space, regardless of the sources of those motions. For example, a viewer wearing a head mounted display while riding in a bus would, if the vehicle turned a corner, effectively rotate within the data space (or the data space would be seen to rotate around the viewer, depending on frame of reference).

Such an arrangement as shown in FIG. 3A through FIG. 3C, wherein motions in the physical world that are not directly made by the viewer may nevertheless be interpreted as viewer motions, and converted into motions within a data space, may be problematic. For example, a data space may be made to move relative to the viewer (or the viewer move relative to data space) in ways that the viewer does not desire, cannot control, etc. Unintended and/or uncontrolled motions may make viewing, using, manipulating, etc. a data space more difficult, or in certain cases impossible. Consider for example a viewer in a vehicle moving at highway or airline speeds. In such case, content in data space might effectively move past the user at tens or even hundreds of kilometers per hour. Even if controllable at such speeds, passing through content in a data space at such a rate may be distracting, dizzying, etc. As another example, climbing or descending an incline (e.g. a hill, a traffic ramp, etc.) in a vehicle might cause data being viewed to shift up or down. Issues such as these may be particularly problematic if the viewer is operating the vehicle, and/or relying on the data being shifted to help operate or navigate the vehicle.

However, distinguishing deliberate motion by a viewer made with the intent (or at least the expectation) of addressing a data space from other motions is non-trivial. An accelerometer or gyroscope be disposed on a display, for example, typically senses the total acceleration or total rotation respectively; no distinction is made by the sensor, and in at least some cases no distinction can be made by the sensor, as to what component(s) of acceleration or rotation are from what sources.

In addition, if a display (and/or a sensor for a display) is turned on while already moving—if for example a person with a head mounted display turns the display on in an aircraft after take-off—then when the movement stops the display (and/or the display's sensor) may sense the acceleration and apply a backward motion to the viewer within the data space. While this may not necessarily affect all possible sensors, certain common sensors such as accelerometers may be subject to such an effect.

Thus, considering only total motion may be undesirable for at least certain applications.

However, arrangements may be made according to the present invention to facilitate adjusting sensed motion so as to more readily distinguish those motions executed as inputs to control or address a data space, as opposed to incidental motions.

Figure 4A:
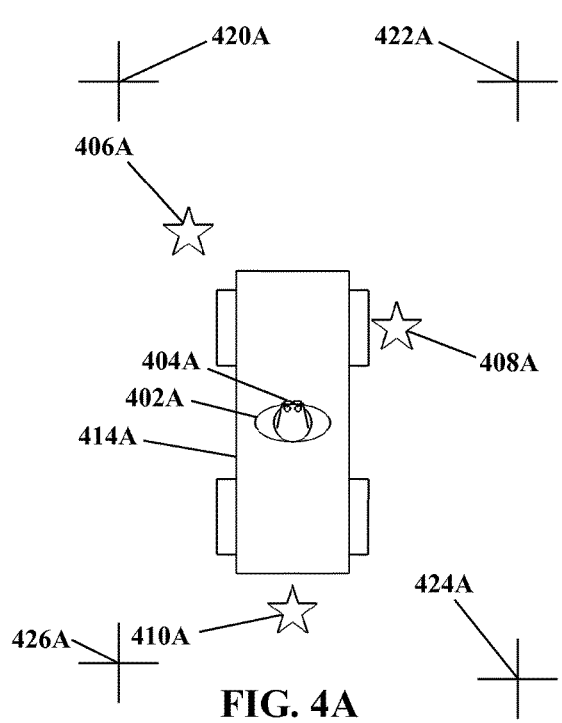
FIG. 4A through FIG. 4C show examples of viewer motions within an environment in the physical world that are transformed into substantially corresponding motions in a data world, wherein an adjustment for the motion of the environment in the physical world is incorporated.

Turning to FIG. 4A, a viewer 402A with a display 404A is shown, disposed within both the physical world as indicated by registration marks 420A, 422A, 424A, and 426A and a data space as represented by data content 406A, 408A, and 410A. In addition, a vehicle 414A is shown with the viewer 402A and the display 404A disposed therein.

Figure 4B:
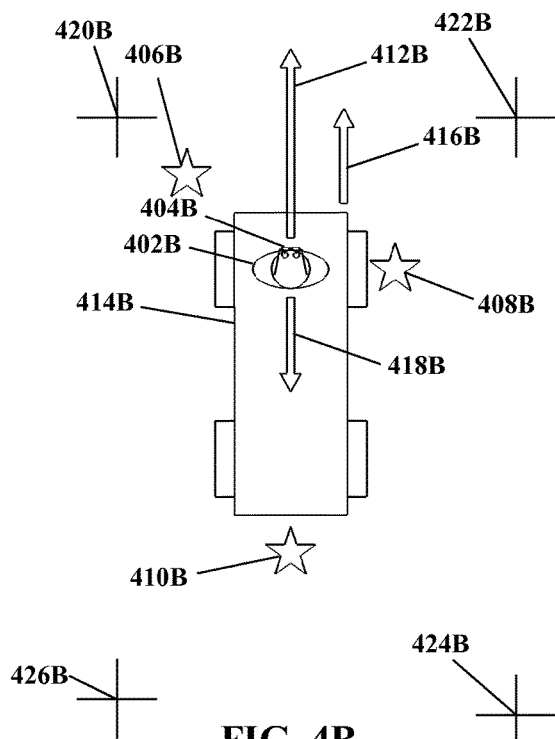

With reference to FIG. 4B, a viewer 402B with a display 404B is shown, disposed within both the physical world as indicated by registration marks 420B, 422B, 424B, and 426B and a data space as represented by data content 406B, 408B, and 410B. A vehicle 414B also is shown with the viewer 402B and display 404B disposed therein.

As may be observed through comparison with FIG. 4A, in FIG. 4B the viewer 402B and display 404B have translated forward within the physical world. The motion is indicated by a vector 412B indicating approximate direction and magnitude of the translation in physical space.

In addition, the vehicle 414B also has translated forward within the physical world. The motion of the vehicle is indicated by a vector 416B indicating approximate direction and magnitude of the translation.

Note that vector 412B represents the total translation, not just the translation of the viewer 402B and display 404B within the vehicle 414B. By contrast, vector 416B represents only the translation of the vehicle 414B.

In addition, FIG. 4B shows an output adjustment 418B. This output adjustment 418B is illustrated as a vector similar in magnitude to the vector 416B representing the motion in physical space of the vehicle 414B, but opposite in direction. In effect, the output adjustment 418B adjusts the motion of the viewer 402B and display 404B within data space, removing (or perhaps more precisely canceling out) the motion of the vehicle 414B in physical space insofar as motion in physical space is converted to motion in data space.

The effect of this cancellation may be seen by observing the content 406B, 408B, and 410B. As may be seen, the content 406B, 408B, and 410B has been translated forward relative to physical space (or from the point of view of the viewer 402B, adjusted backward). Thus, the motion of the vehicle 414B is canceled out, such that the content 406B, 408B, and 410B is "carried along" with the vehicle 414B. Thus the only motion applied to the viewer 402B and the display 404B with respect to the data space is the motion in physical space with respect to the vehicle 414B.

Stated more generally, in the present invention according to FIG. 4B the motion of the vehicle 414B (or other environment) is used to determine a viewpoint motion within the data space that is different from the total motion in physical space. In particular, the viewpoint motion (in the data space) substantially corresponds with the total motion (in physical space) combined with the output adjustment 418B.

Figure 4C:
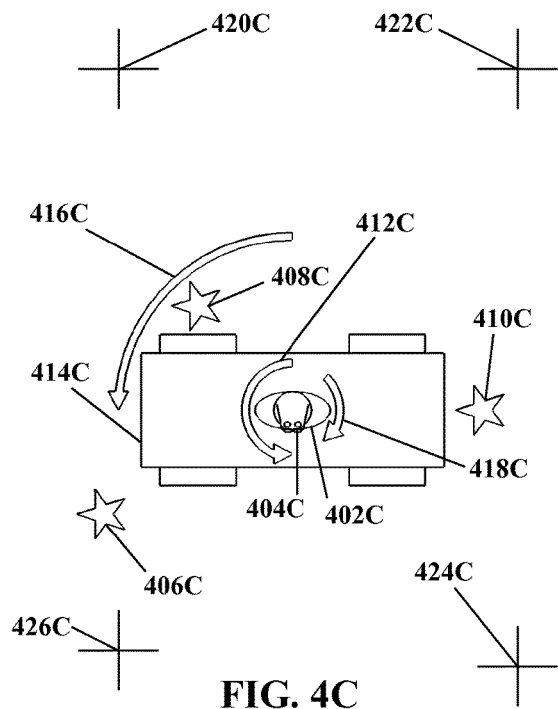

Now with reference to FIG. 4C, a viewer 402C with a display 404C is shown, disposed within both the physical world as indicated by registration marks 420C, 422C, 424C, and 426C and a data space as represented by data content 406C, 408C, and 410C. A vehicle 414C also is shown with the viewer 402C and display 404C disposed therein.

As may be observed through comparison with FIG. 4A, in FIG. 4C the viewer 402C and display 404C have rotated counterclockwise within the physical world. The motion is indicated by a vector 412C indicating approximate direction and magnitude of the rotation in physical space.

In addition, the vehicle 414C also has rotated counterclockwise within the physical world. The motion of the vehicle is indicated by a vector 416C indicating approximate direction and magnitude of the translation.

Again, note that vector 412C represents the total rotation, not just the rotation of the viewer 402C and display 404C within the vehicle 414C. By contrast, vector 416C represents only the rotation of the vehicle 414C.

In addition, FIG. 4C shows an output adjustment 418C. This output adjustment 418C is illustrated as a vector similar in magnitude to the vector 416C representing the motion in physical space of the vehicle 414C, but opposite in direction. In effect, the output adjustment 418C adjusts the motion of the viewer 402C and display 404C within data space, removing (or perhaps more precisely canceling out) the motion of the vehicle 414C in physical space insofar as motion in physical space is converted to motion in data space.

The effect of this cancellation may be seen by observing the content 406C, 408C, and 410C. As may be seen, the content 406C, 408C, and 410C has been translated counterclockwise relative to physical space (or from the point of view of the viewer 402C, adjusted clockwise). Thus, the motion of the vehicle 414C is canceled out, such that the content 406C, 408C, and 410C is "carried along" with the vehicle 414C. Thus the only motion applied to the viewer 402C and the display 404C with respect to the data space is the motion in physical space with respect to the vehicle 414C.

Stated more generally, and similarly to FIG. 4B, in the present invention according to FIG. 4C the motion of the vehicle 414C (or other environment) is used to determine a viewpoint motion within the data space that is different from the total motion in physical space. In particular, the viewpoint motion (in the data space) substantially corresponds with the total motion (in physical space) combined with the output adjustment 418C.

As may be seen in FIG. 4B and FIG. 4C as compared with FIG. 4A, in this example of behavior according to the present invention only a portion of motion in physical space is converted to motion in data space. The motions that are converted, typically though not necessarily, are limited to those motions personally made by the viewer, rather than incidental motions such as motions of a vehicle in which the viewer may be traveling.

This discrimination is accomplished, as shown in FIG. 4A through FIG. 4C, by determining both the total motion and the incidental motion(s). In the examples illustrated in FIG. 4B and FIG. 4C the only incidental motions shown are overall motions of the vehicle, e.g. the vehicle moves forward, the vehicle turns counterclockwise, etc. However, other incidental motions likewise may be sensed or otherwise determined and similarly removed through an output adjustment. More regarding this is described later, but it is noted that the present invention is not limited only to output adjustments that counteract overall motions of vehicles or other environments.

Typically (as is described further later on herein) determinations of the various motions may be made using sensors. For example, an accelerometer and gyroscope on a vehicle may be used to measure the motion of the vehicle, while another accelerometer and gyroscope on the display may be used to measure the total motion of the display (and typically of the viewer as well). However, other sensors and other arrangements may be equally suitable.

As a consequence of the present invention, the motions that are used to control and/or manipulate a data space are not limited only to the total sums of motions. Rather, a viewer might "carry along" a data space even while traveling at high speed, yet still be able to translate within that data space, change orientation within the data space, etc., for example so as to view and/or interact with different portions of the data space.

Figure 5A:
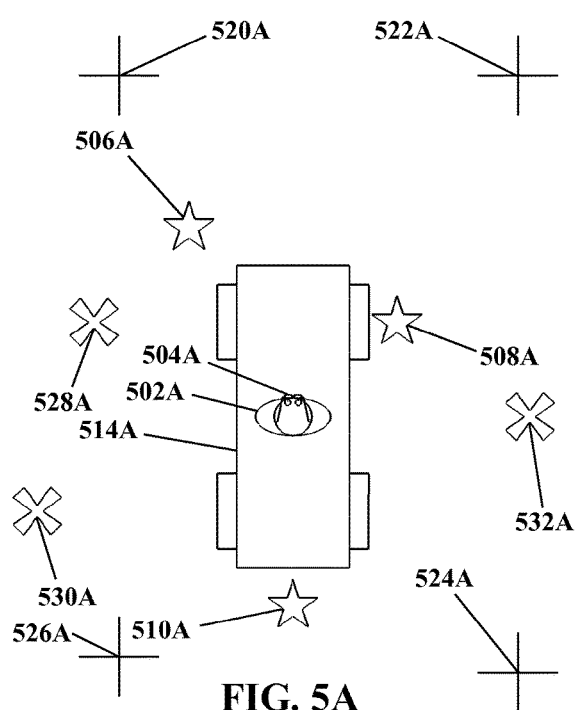
FIG. 5A through FIG. 5C show examples of viewer motions within an environment in the physical world that are transformed into substantially corresponding motions in one data world wherein an adjustment for the motion of the environment in the physical world is incorporated, and wherein those viewer motions also are transformed into substantially corresponding motions in a second data world without adjustment.
Figure 5B:
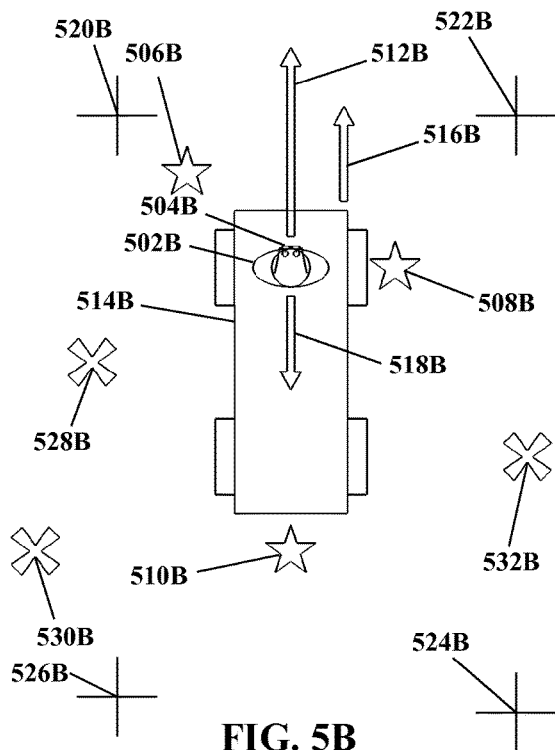
Figure 5C:
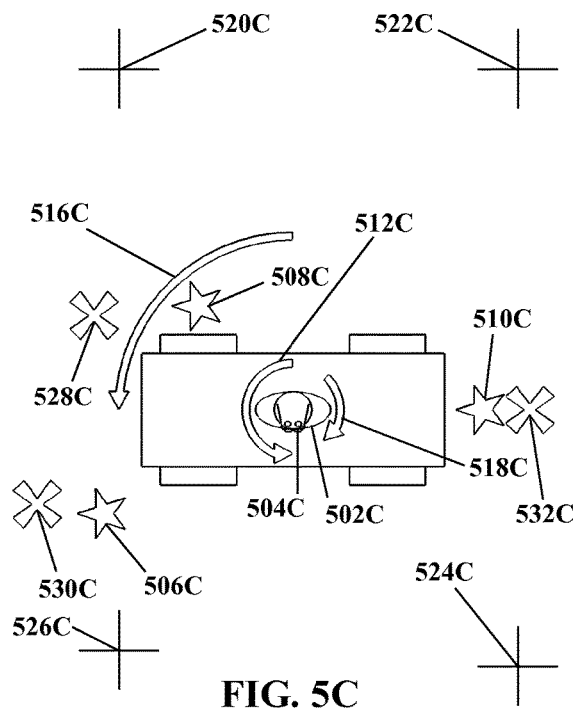

However, although the present invention enables adjusting motions used to interact with data spaces, it should be understood that the present invention does not require such adjustment. For example, as is shown in FIG. 5A through FIG. 5C a data space that utilizes such output adjustments may be used in combination with a data space that does not utilize such output adjustments. This might be useful, for example, if a viewer wished to interact with a "personal" data space that is "carried along" in a moving vehicle, yet still have access to a data space that maps directly to the physical world (e.g. augmented reality data) outside the data space. As a more concrete example, a viewer in a car might choose to have a map or directions that are carried along (and which are subject to output adjustment according to the present invention) while also viewing augmented reality data overlaid onto the road, nearby vehicles, road signs, exits, etc. which will be subject to the viewer's total motion (i.e., so that the augmented reality data remains properly aligned with the real-world structures that are being augmented).

Now with reference to FIG. 5A, a viewer 502A with a display 504A is shown, disposed within both the physical world as indicated by registration marks 520A, 522A, 524A, and 526A and a data space as represented by data content 506A, 508A, and 510A. In addition, a vehicle 514A is shown with the viewer 502A and the display 504A disposed therein.

In addition, FIG. 5A shows data content 528A, 530A, and 532A represented by X marks. Content 528A, 530A, and 532A is distinct from content 506A, 508A, and 510A, being in a different data space. The data spaces of content 506A, 508A, and 510A and of content 528A, 530A, and 532A may overlap one another partially or even entirely, but behave differently in response to physical world motion (as will be explained with regard to FIG. 5B and FIG. 5C).

With reference now to FIG. 5B, a viewer 502B with a display 504B is shown, disposed within both the physical world as indicated by registration marks 520B, 522B, 524B, and 526B, a first data space as represented by data content 506B, 508B, and 510B indicated by stars, and a second data space as represented by content 528B, 530B, and 532B indicated by X marks. A vehicle 514B also is shown with the viewer 502B and display 504B disposed therein.

As may be observed through comparison with FIG. 5A, in FIG. 5B the viewer 502B and display 504B have translated forward within the physical world. The motion is indicated by a vector 512B indicating approximate direction and magnitude of the translation in physical space. In addition, the vehicle 514B also has translated forward within the physical world. The motion of the vehicle is indicated by a vector 516B indicating approximate direction and magnitude of the translation.

FIG. 5B also shows an output adjustment 518B. This output adjustment 518B is illustrated as a vector similar in magnitude to the vector 516B representing the motion in physical space of the vehicle 514B, but opposite in direction.

In effect, the output adjustment 518B adjusts the motion of the viewer 502B and display 504B within the data space that contains content 506B, 508B, and 510B, removing (or perhaps more precisely canceling out) the motion of the vehicle 514B in physical space insofar as motion in physical space is converted to motion in that first data space. However, the output adjustment 518B does not adjust the motion of the viewer 502B and display 504B within the data space that contains content 528B, 530B, and 532B.

As may be seen, the content 506B, 508B, and 510B in the first data space has been translated forward relative to physical space (or from the point of view of the viewer 502B, adjusted backward). Thus, the motion of the vehicle 514B is canceled out, such that the content 506B, 508B, and 510B is "carried along" with the vehicle 514B. Thus the only motion applied to the viewer 502B and the display 504B with respect to the data space is the motion in physical space with respect to the vehicle 514B.

By contrast, the content 528B, 530B, and 532B in the second data space has not been adjusted. Thus the full motion of the viewer 502B and display 504B (including that from the vehicle 514B) in physical space is applied with respect to the second data space.

More colloquially, the first data space (and content 506B, 508B, and 510B) appear to the viewer 502B to be carried along with the viewer 502B, while the second data space (528B, 530B, and 532B) appear to remain stationary with respect to physical space to the viewer 502B.

With reference now to FIG. 5C, a viewer 502C with a display 504C is shown, disposed within both the physical world as indicated by registration marks 520C, 522C, 524C, and 526C, a first data space as represented by data content 506C, 508C, and 510C indicated by stars, and a second data space as represented by content 528C, 530C, and 532C indicated by X marks. A vehicle 514C also is shown with the viewer 502C and display 504C disposed therein.

As may be observed through comparison with FIG. 5A, in FIG. 5C the viewer 502C and display 504C have rotated counterclockwise within the physical world. The motion is indicated by a vector 512C indicating approximate direction and magnitude of the translation in physical space. In addition, the vehicle 514C also has rotated counterclockwise within the physical world. The motion of the vehicle is indicated by a vector 516C indicating approximate direction and magnitude of the rotation.

FIG. 5C also shows an output adjustment 518C. This output adjustment 518C is illustrated as a vector similar in magnitude to the vector 516C representing the motion in physical space of the vehicle 514C, but opposite in direction.

In effect, the output adjustment 518C adjusts the motion of the viewer 502C and display 504C within the data space that contains content 506C, 508C, and 510C, removing (or perhaps more precisely canceling out) the motion of the vehicle 514C in physical space insofar as motion in physical space is converted to motion in that first data space. However, the output adjustment 518C does not adjust the motion of the viewer 502C and display 504C within the data space that contains content 528C, 530C, and 532C.

As may be seen, the content 506C, 508C, and 510C in the first data space has been rotated counterclockwise relative to physical space (or from the point of view of the viewer 502C, adjusted clockwise). Thus, the motion of the vehicle 514C is canceled out, such that the content 506C, 508C, and 510C is "carried along" with the vehicle 514C. Thus the only motion applied to the viewer 502C and the display 504C with respect to the data space is the motion in physical space with respect to the vehicle 514C.

By contrast, the content 528C, 530C, and 532C in the second data space has not been adjusted. Thus the full motion of the viewer 502C and display 504C (including that from the vehicle 514C) in physical space is applied with respect to the second data space.

More colloquially, the first data space (and content 506C, 508C, and 510C) appear to the viewer 502C to be carried along with the viewer 502C, while the second data space (528C, 530C, and 532C) appear to remain stationary with respect to physical space to the viewer 502C.

With regard to FIG. 1A through FIG. 5C, for purposes of clarity the motions shown therein are relatively simple. That is, individual illustrations show simple translations or rotations in the same direction, along or around a single Cartesian axis, etc. However, this is an example only, and the present invention is not limited only to arrangements with such simple motions. Multiple motions, translations along multiple axes and/or rotations around multiple axes, motions that are dissimilar (e.g. a viewer walking backward while a vehicle moves forward, or a viewer turning clockwise while a vehicle turns counterclockwise, etc.), and so forth likewise may be considered and utilized by the present invention.

Figure 6:
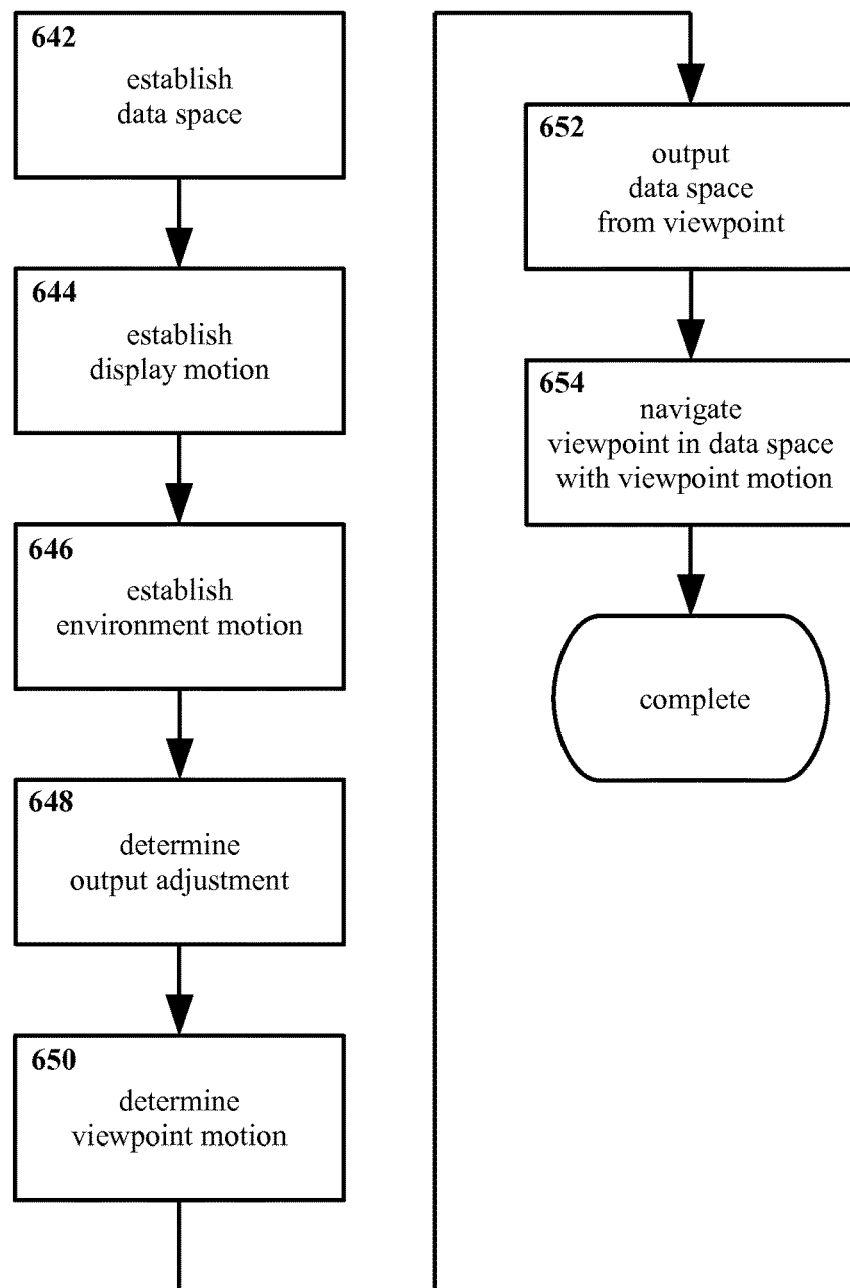
FIG. 6 shows an example method for adjusting motion-based data space manipulation according to the present invention, in flow-chart form.

Now with regard to FIG. 6, an example method for adjusting motion-based data space manipulation is shown therein in flow-chart form.

In the example method according to FIG. 6, a data space is generated 642. A data space may not be a tangible "thing" per se, but rather may be considered as a space, environment, and/or portion of an environment. A data space may include but is not limited to a region or construct adapted to store, display, and/or manipulate data therein, typically though not necessarily a three dimensional space that includes visual representations, such as a virtual reality or augmented reality space.

A data space thus is a "place" (though perhaps entirely virtual) that may enable content to be disposed therein, may support user actions (and/or potentially enables user actions to be processed as system inputs), may enable expression of system events and/or outputs, etc. A data space might also be considered to be a collection of rules, behaviors, etc. that define the manner by which interaction between a user and a system (and potentially content associated with the data space, etc.) may be carried out. A data space will not necessarily have any visible presence or otherwise be directly sensible to a user thereof (though visibility is not excluded).

A data space may or may not be bounded, and if bounded may or may not have boundaries that are well-defined. Such an arrangement may resemble in at least some senses that of a physical world, wherein the boundaries thereof may not necessarily be well-defined. Considering the Earth as an example, the surface thereof is certainly finite but is at least arguably unbounded, at least insofar as the Earth is considered as a surface, since it is possible to translate and/or rotate indefinitely on the surface of the Earth without leaving the Earth.

The present invention is not particularly limited with regard to what sort of data space may be established, or how that data space is established. As an example, a data space as generated in step 642 may be a three dimensional visual environment, supporting virtual and/or augmented reality content therein and manipulation thereof by a viewer, but other arrangements may be equally suitable.

Typically, though not necessarily, a data space is established within a processor such as a processor in a head mounted display, portable electronic device, etc. However other arrangements may be equally suitable.

Continuing in FIG. 6, a display motion is established 644. Display motion is a motion of a display, or a portion of a display, within physical space. Typically though not necessarily display motion corresponds with motion of a viewer if the display is or is part of a wearable electronic device such as a head mounted display.

Display motion may be, but is not required to be, the sum total of all motions undertaken by the display. Certain motions may be excluded, e.g. because the motions are inconsequential, because the motions are problematic to sense or otherwise work with, etc. For example, although strictly speaking a person who is nominally stationary on the Earth is in fact orbiting the Sun at considerable speed, this motion may not be considered (and typically is not), though consideration thereof also is not prohibited.

Display motion may be established using sensors particularly adapted to sense accelerations and/or motions, for example accelerometers, gyroscopes, etc. However, other arrangements may be equally suitable. For example, by comparing changes between images taken over time it may be suitable for at least certain embodiments to establish the motion(s) of the display by image processing, utilizing one or more imagers on the display as sensors. Furthermore, sensors not on the display may be utilized in establishing the display motion. For example, imagers, rangefinders, depth sensors, etc. might determine the motion of a display (and/or a viewer) even if at considerable distance from the viewer. In such case the motion might then be transmitted to the display, to a processor controlling or interacting with the display, etc.

Thus the term "establishing" as applied to motion data herein is not limited only to directly sensing motion, and may include computing motion from other data, receiving motion information, etc.

Still with regard to FIG. 6, environment motion is established 646. Environment motion is motion which affects and/or contributes to the overall display motion, but which typically is associated with some environment or environmental factor. Typically though not necessarily, environment motion may be selected based on convenience of sensing and/or processing. For example, while (as noted earlier) directly sensing the personal motion of a viewer riding in a vehicle may be impractical for certain situations, measuring the total motion (display motion) and the vehicle motion (environment motion) may be more practical, and may enable the personal motion of the viewer to be calculated where such personal motion could not be conveniently measured directly.

Environment motion includes, but is not limited to, the motion of vehicles such as cars, trucks, buses, trains, ships, aircraft, etc. In addition, environment motion may include more specific motions such as the "bounce" experienced by a person riding in a vehicle, e.g. a car passenger on a bumpy road. Multiple environment motions from a single environment and/or multiple environment motions from multiple environments may be considered.

As noted for display motion, environment motion may be established using sensors particularly adapted to sense accelerations and/or motions, for example accelerometers, gyroscopes, etc. Typically such sensors may be disposed on the environment in such a way as to facilitate sensing of the motion(s) in question, e.g. an accelerometer for sensing the motion of a vehicle in which a viewer is riding might be mounted on the vehicle itself, transmitting the motion information to a display worn by a viewer.

However, sensors other than accelerometers and gyroscopes may be equally suitable, including but not limited to image sensors. Likewise, sensors not on the display may be utilized in establishing the display motion.

Moving on in FIG. 6, an output adjustment is determined 648. That is, the motions as established in steps 644 and 646 are considered, and a suitable adjustment is made based on circumstances and the particulars of a given embodiment. For example, for a viewer riding in a car, an output adjustment may be made that approximates or equals the magnitude of the vehicle's motion, but that is opposite in direction. In such fashion, a motion to which the output adjustment is applied would effectively have canceled out the motion of the car. However, other arrangements may be equally suitable, and the present invention is not limited only to output adjustments opposite the environment motion. For example, output adjustments that include other motions than environment motions, including but not limited to display motions, may be suitable. More particular examples, such as the consideration of induced display motions and damping of environmental motions, are described subsequently herein.

A viewpoint motion is determined 650. Typically, the viewpoint motion is determined by considering the overall display motion (as established at step 644) and adjusting the display motion with the output adjustment (as determined at step 648). The viewpoint motion is the motion through which a point of view as outputted by the display moves through the data space, or, stated differently, the apparent motion of the data space around the point of view. The viewpoint motion might also be considered to be the motion of the viewer through the data space.

Still with regard to FIG. 6, the viewpoint is outputted 652 to the display. That is, at least some portion of the data space as may be visible from the viewpoint is (for example) shown visually on one or more screens, such as near-eye screens on a wearable head mounted display. Outputting the viewpoint 652 transforms the data space into output as may be sensed by a viewer. Typically but not necessarily such output is graphical in nature, such as text, images, video, etc., though the present invention is not limited only thereto. For example, audio output, including but not limited to audio output generated with sources that have defined positions within the data space (and thus which the viewer may move with respect to while within data space) also may be suitable.

Continuing in FIG. 6, the viewpoint is then navigated 654 within the data space at least substantially in accordance with the viewpoint motion as determined in 650 and outputted in 652. That is, the view of the data space is updated to correspond with the motion of the viewpoint through that data space (e.g. based on display motion, environment motion, etc.). For example, the viewpoint might move forward within the data space, rotate, and so forth. In addition, for at least certain embodiments navigation within the data space also may include an update to the data space and/or to some system for tracking position and orientation within the data space. That is, whatever system controls the data space and determines what is visible from the viewpoint (typically though not necessarily a program including executable instructions instantiated on a processor) may be informed of changes in the position and/or orientation of the viewpoint. As a more concrete example, if the viewpoint translates to the right within a virtual reality environment, the new position of the viewpoint within the virtual reality environment may be tracked and/or utilized by whatever program (or other entity) is controlling that virtual reality environment.

Although FIG. 6 shows the method as being complete after step 654 for purposes of simplicity, in practice a method according to the present invention may repeat, for example returning to step 644, and indeed may repeat in many loops and/or indefinitely, addressing motions in an ongoing fashion.

It is noted that any or all of the motions in FIG. 6 may at any given time be zero, or substantially zero. Although various motions may be sensed and/or enabled, the present invention does not require that any particular motion (or any motion at all) be present at any particular time or under any particular circumstances.

With regard particularly to step 646 in FIG. 6, it is noted that multiple environment motions may be established. For example, as mentioned for at least certain embodiments it may be desirable to cancel out what might be referred to as "road noise" (or for an aircraft, turbulence, etc.). That is, random or semi-random motions associated with rough pavement, poorly tuned shock absorbers, etc. may be considered as an environment motion just as the gross motion of the vehicle or other environment (e.g. moving forward, turning counterclockwise, etc.) may be considered as an environment motion.

In such case, multiple independent or semi-independent determinations of different environment motions may be made, potentially with multiple sensors. For example, one sensor on the frame of a vehicle might sense gross motion of the vehicle, while a sensor in the vehicle seat might sense vibrations as transmitted to the viewer.

In addition, as noted above, environment motions may be partially or entirely calculated. To continue the example of road noise, given data regarding gross motion of a vehicle it may be possible to calculate or at least approximate the motion that the display will exhibit when those motions are carried to the display, e.g. through the vehicle floor, the vehicle seat, the viewer's body, etc. For example, for certain embodiments the various components between vehicle frame and display might be analyzed physically as damped vibrations, using physical equations therefor. Associated spring constants, damping factors, etc. might be measured (for example for the vehicle seat, during vehicle development), estimated (for a viewer in the seat based on general human anatomy), etc.

Other environment motions, and other arrangements for establishing such environment motions, may be equally suitable.

When multiple environment motions are present and/or are addressed by an embodiment of the present invention, typically such multiple motions may be combined into a single output adjustment. To continue the example above, the gross vehicle motion and road noise, while potentially distinct motions, may be converted into a single output adjustment that both cancels out overall vehicle motion and the "shaking" caused by rough roads. However, the use of multiple output adjustments is not excluded, and may be suitable for certain embodiments.

More description addressing multiple motions is presented herein with regard to FIG. 8 and FIG. 9.

Figure 7A:
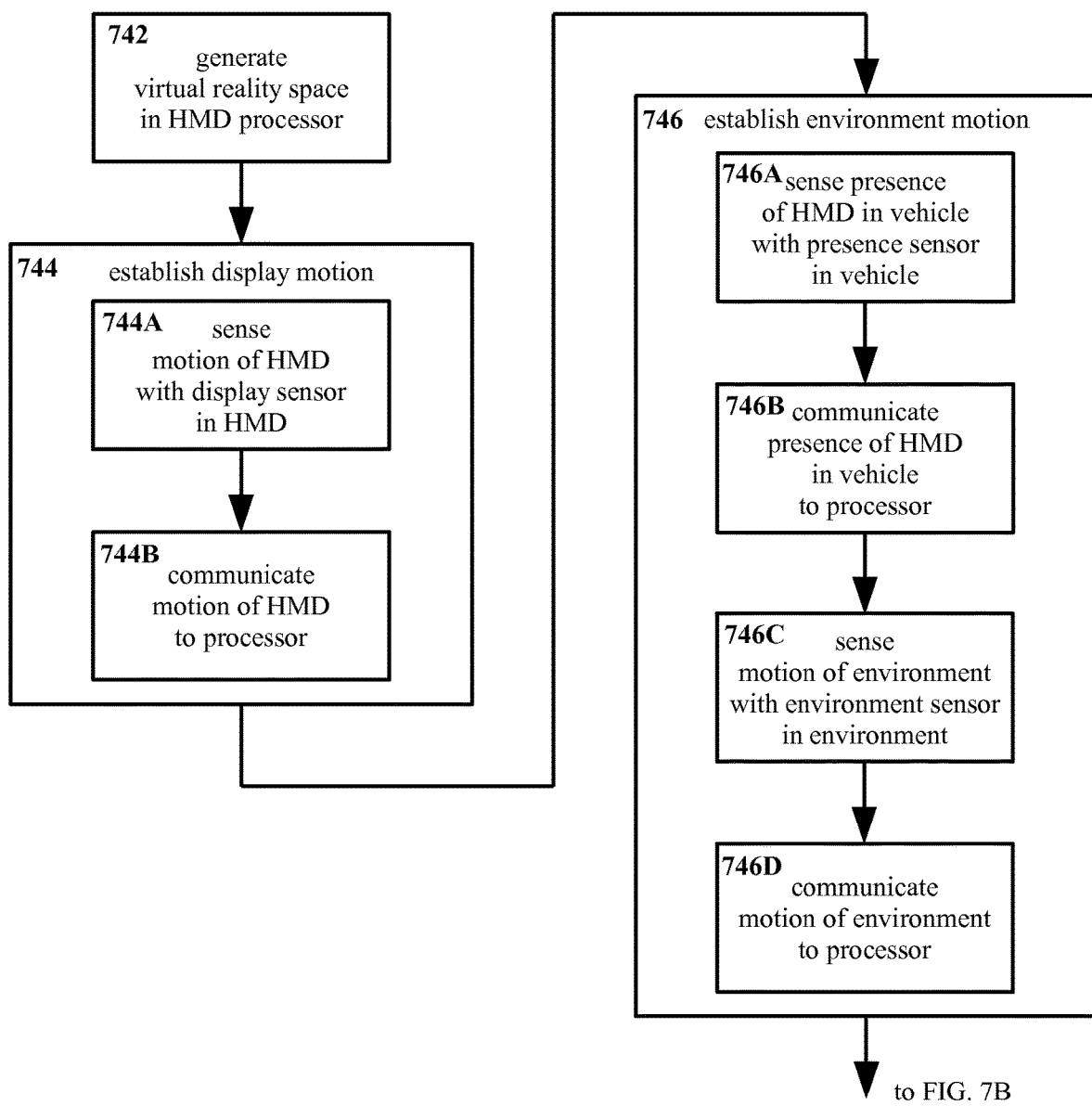
FIG. 7A and FIG. 7B show an example method for adjusting motion-based virtual reality space manipulation in a head mounted display according to the present invention, in flow-chart form.
Figure 7B:
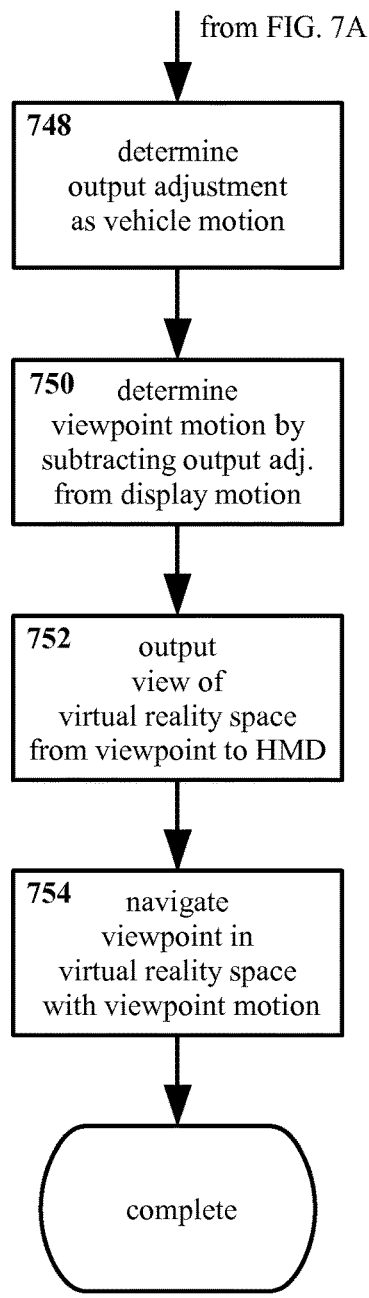

Now with regard to FIG. 7A and FIG. 7B, an arrangement at least somewhat similar to that described with regard to FIG. 6 is shown, but in more concrete form. The arrangement of FIG. 7A and FIG. 7B is presented for clarity, and the present invention is not limited only to the specifics shown therein (e.g. virtual reality spaces, head mounted displays, etc.).

In FIG. 7A, a virtual reality space is generated 742 in the processor of a head mounted display (abbreviated "HMD" in FIG. 7, and likewise FIGS. 8 and 9, for brevity). Typically though not necessarily such a virtual reality space may be a three dimensional space with at least visual representations therein, and may be generated through the use of executable instructions and data instantiated on the processor.

A display motion is established 844. The display motion is the motion of the HMD within physical space, typically though not necessarily the sum of all motions of the HMD within physical space. For the arrangement of FIG. 7A, establishing 744 the display motion may be considered as several sub steps. The display motion of the HMD may be sensed 744A with a display sensor in and/or on the HMD, such as an accelerometer, imager, GPS, etc. That display motion of the HMD then may be communicated 744B to the processor, e.g. through a wired or wireless link, etc. As noted elsewhere, although motion of the HMD (or other display) may be sensed through the use of sensors disposed on and/or in the HMD itself, other arrangements also may be equally suitable, including but not limited to sensing with sensors distal from the HMD, and/or receipt of motion information communicated to the HMD without the HMD necessarily sensing that information directly.

Continuing in FIG. 7A, an environment motion is established 746. Environment motion is motion of the HMD within physical space, but motion that is (or at least may be) incidental, in that such motion is not desired or intended to produce an effect within the virtual reality space. Thus, for a viewer wearing the HMD on a ship, the ship may be considered an environment, and the ship's motion may be considered environment motion.

Typically though not necessarily, a distinction may be made between motions personally produced by the user such as walking, climbing, turning one's head, etc., and motions externally applied to the user as a whole such as those from ships, cars, planes, elevators, etc. However, this is not an absolute distinction; if for example a virtual reality space (or an augmented reality space, etc.) were to mimic or correspond with (or overlay onto, etc.) the architecture of a ship or building, and the viewer utilized an elevator while in the ship or building, then the elevator motion might not be considered to be environment motion. Alternately, the elevator motion might be considered environment motion, but nevertheless might not be adjusted away, depending on the particulars of the embodiment.

Thus, although the present invention enables cancellation of certain physical-world motions, including but not limited to vehicle motions, from being translated into a data space, not all physical vehicle motions (or other motions) necessarily are so cancelled.

Still with regard to FIG. 7A, establishing the environment motion 746 may be considered as several sub steps. The presence of the HMD within a vehicle (or other environment) may be sensed 746A with a presence sensor in the vehicle. That presence then may be communicated 746B to the processor in the HMD.

For example, an automobile might include a sensor for determining whether an HMD is present in that automobile, so as to facilitate establishing the environment motion. Such a sensor may be a camera using object identification, a communicator sending queries for devices such as HMDs and determining presence by a response from such devices, etc. Other arrangements may be equally suitable. In addition, arrangements wherein a presence sensor is disposed other than on the vehicle, for example on the HMD, may be suitable. Arrangements wherein no such sense may be suitable as well for at least certain embodiments (in which case sub steps 746A and/or 746B may not be necessary).

The motion of the vehicle (environment) in which the HMD is disposed may be sensed 746C with an environment sensor in and/or on the vehicle, such as an accelerometer, imager, GPS, etc. The motion of the vehicle then may be communicated 746D to the processor in the HMD, e.g. through a wired or wireless link, etc. As noted with step 744, the vehicle motion (or other environment motion) is not limited only to being sensed with sensors in or on the vehicle, and use of sensors on the HMD or elsewhere, use of sensors distal to the vehicle and/or HMD, and/or receipt of information without directly considering sensors also may be equally suitable.

For clarity, the display sensor, presence sensor, and environment sensor are referred to herein individually in at least some instances, as if being distinct and separate sensors. However, this is an example only, and arrangements wherein a single sensor serves two or more such purposes (and/or other purposes) may be equally suitable. Likewise, although in at least some places the display sensor, presence sensor, and environment sensor are referred to in the singular, in certain embodiments multiple display sensors, presence sensors, and/or environment sensors may be suitable.

Now with reference to FIG. 7B, an output adjustment is determined 748 as being at least substantially the vehicle motion. That is, in the example shown, only a single environment motion—namely, the vehicle motion—is established 746, and that single vehicle motion is considered to be (or at least to substantially approximate) the output adjustment that is to be applied to the display motion (below). Multiple environment motions, and/or other factors, may be addressed in certain embodiments, but for clarity FIG. 7 considers only one such, and determines 748 the output adjustment as being simply that one environment motion; however other arrangements may be equally suitable (and certain such arrangements are show, for example in FIGS. 8 and 9).

The viewpoint motion is determined 750 by subtracting the output adjustment (determined in 748) from the display motion of the HMD (established in 744). Thus, for a viewer wearing the HMD in an automobile, the automobile's motion is subtracted from the total motion of the HMD. Consequently, if the viewer turns his or her head, moves within the automobile, etc., that motion may be considered for example as input to the HMD, but the portion of the total motion in space of the HMD that is contributed by the automobile (e.g. forward movement at highway speeds) may be ignored for at least certain purposes (e.g. being ignored as input, so that the viewer does not move through the virtual reality space also at highway speeds).

Still with reference to FIG. 7B, a view representing at least some portion of the virtual reality space from the viewpoint is outputted 752 to the viewer (e.g. by outputting that view to the HMD screen or screens). Typically though not necessarily this may include some or all of the graphical objects (if any) in the virtual reality display, as would be visible from some perspective within the virtual reality space corresponding to the viewpoint. However, other arrangements may be equally suitable.

That viewpoint is navigated 754 within the virtual reality space at least substantially in accordance with the viewpoint motion as determined in 750 and outputted in 752. Thus the appearance of the virtual reality space as visible to the viewer, and/or the registered position of the viewpoint within the virtual reality space, may be updated by the processor in response to the viewpoint motion.

Figure 8A:
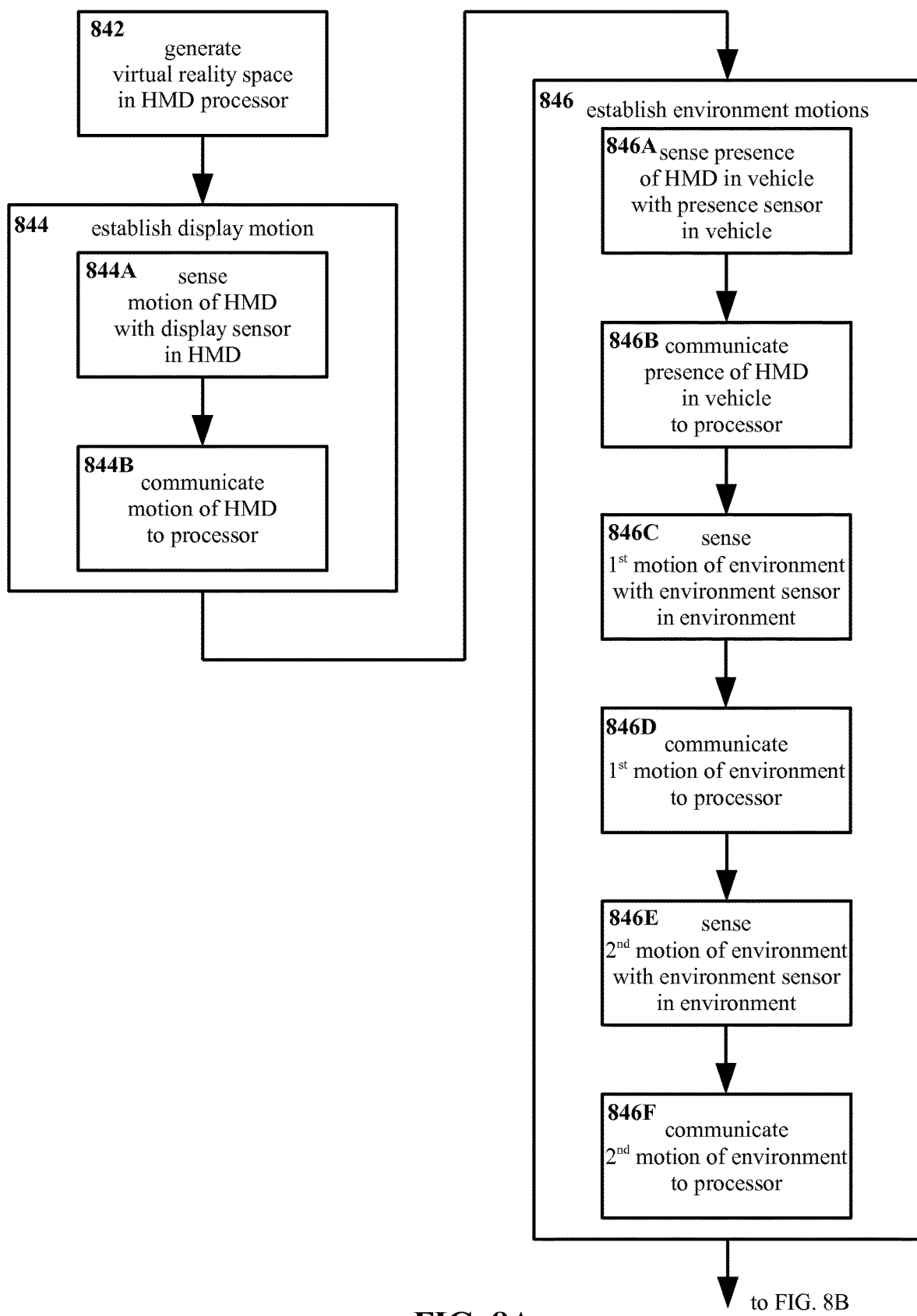
FIG. 8A and FIG. 8B another example method for adjusting motion-based virtual reality space manipulation in a head mounted display according to the present invention, considering multiple sensed environment motions, in flow-chart form.
Figure 8B:
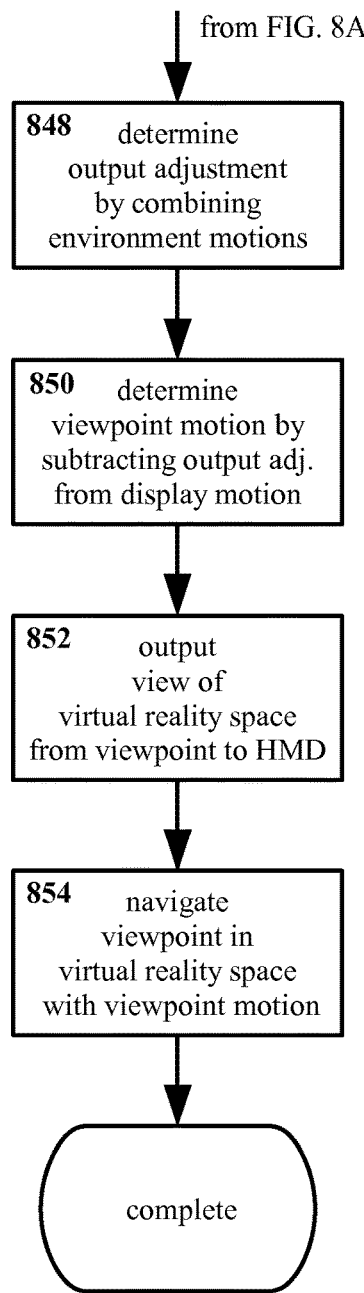

Turning now to FIG. 8A and FIG. 8B, an arrangement at least somewhat similar to that in FIG. 7A and FIG. 7B is shown, but considering multiple sensed motions of the environment.

In FIG. 8A, a virtual reality space is generated 842 in the processor of an HMD. A display motion is established 844; establishing the display motion 844 may be considered as several sub steps, namely sensing 844A the display motion with a display sensor in/on the HMD, and communicating 844B that display motion to the processor in the HMD.

Environment motions are established 846. As noted previously, multiple environment motions may be sensed, received, computationally determined, and/or otherwise established. In the arrangement shown in FIG. 8A, establishing 846 environment motions may be considered as several sub steps. The presence of the HMD within the vehicle may be sensed 846A with a presence sensor in the vehicle. That presence then may be communicated 846B to the processor in the HMD.

A first motion of the vehicle in which the HMD is disposed may be sensed 846C with a first environment sensor in and/or on the vehicle. That first motion of the vehicle then may be communicated 846D to the processor in the HMD.

Similarly, a second motion of the vehicle in which the HMD is disposed may be sensed 846E with a second environment sensor in and/or on the vehicle. That second motion of the vehicle then may be communicated 846F to the processor in the HMD.

As a more concrete example of an arrangement with two different sensed motions of a vehicle, consider an arrangement wherein a viewer is using an HMD according to the present invention on board a ship. The first vehicle motion might represent the course of the ship as it moves through the water; the first environment sensor might be a GPS system disposed on the ship, determining the position of the ship over time, and thus the motion thereof. The second sensor might be an accelerometer disposed on the ship, sensing motions related to the pitch, roll, and yaw of the ship while moving through the water. While it may be possible in at least some embodiments to sense all motion with a single sensor, as a single "set" of motion, under at least certain conditions it may be useful to sense environment motion as separate motions (as in this example) rather than necessarily as a combined motion.

It is noted that this example includes the option of receiving data rather than operating directly as a sensor, in that at least certain forms of GPS may be considered to be data reception. That is, positional information is received from GPS satellites, rather than necessarily being measured locally (even if some computation based on that incoming data may be performed locally, e.g. in the HMD processor).

Moving now to FIG. 8B, an output adjustment is determined 848 as the combination of the first and second environment motions, determined in sub steps 846C and 846E respectively. Though simple combination (e.g. superposition of velocities) may be suitable, more complex and/or involved computations are not excluded from the present invention.

The viewpoint motion is determined 850 by subtracting the output adjustment from the display motion of the HMD. A view of the virtual reality space from the viewpoint is outputted 852 to the HMD, and the viewpoint is navigated 854 within the virtual reality space at least substantially in accordance with the viewpoint motion.

Figure 9A:
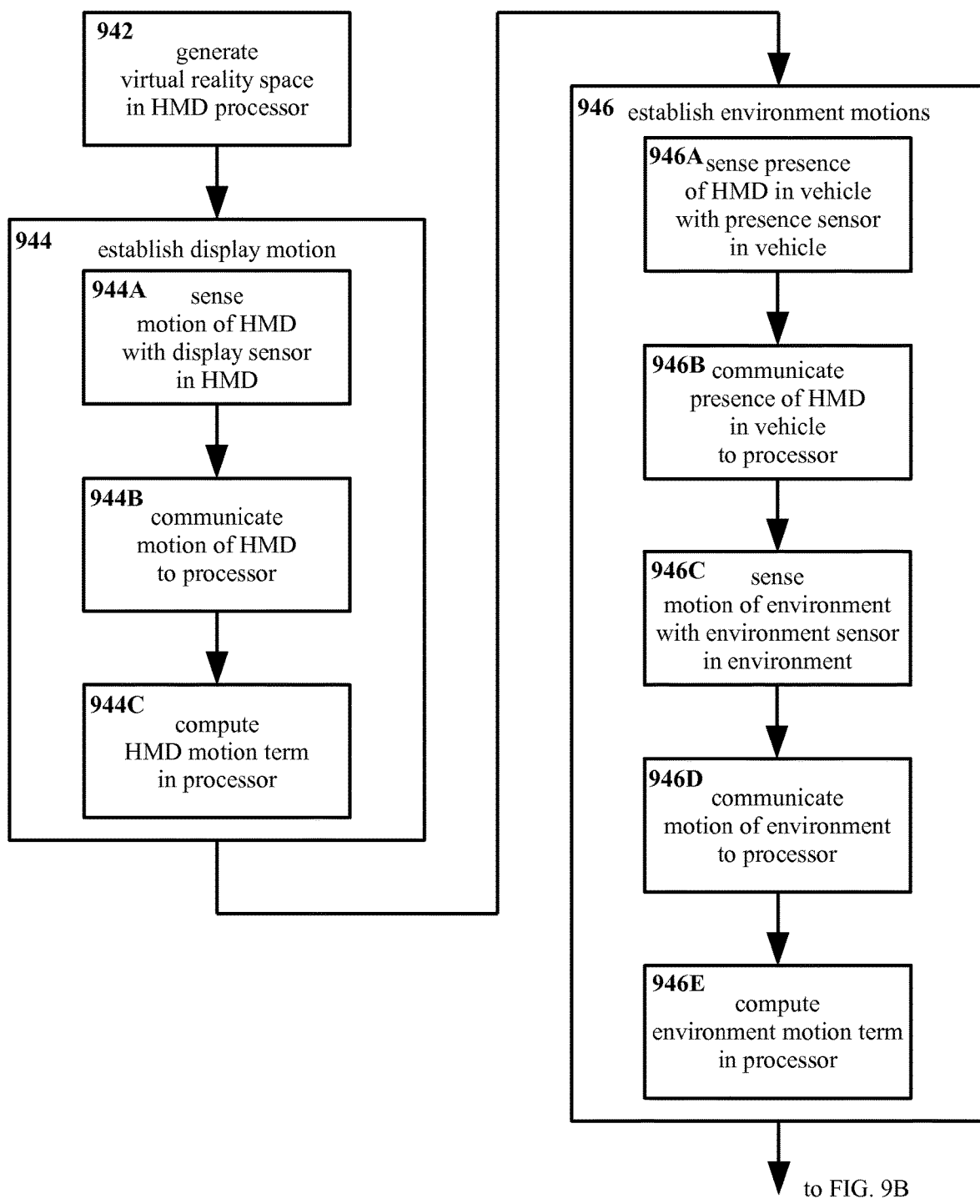
FIG. 9A and FIG. 9B show another example method for adjusting motion-based virtual reality space manipulation in a head mounted display according to the present invention, further considering computationally determined motions, in flow-chart form.
Figure 9B:
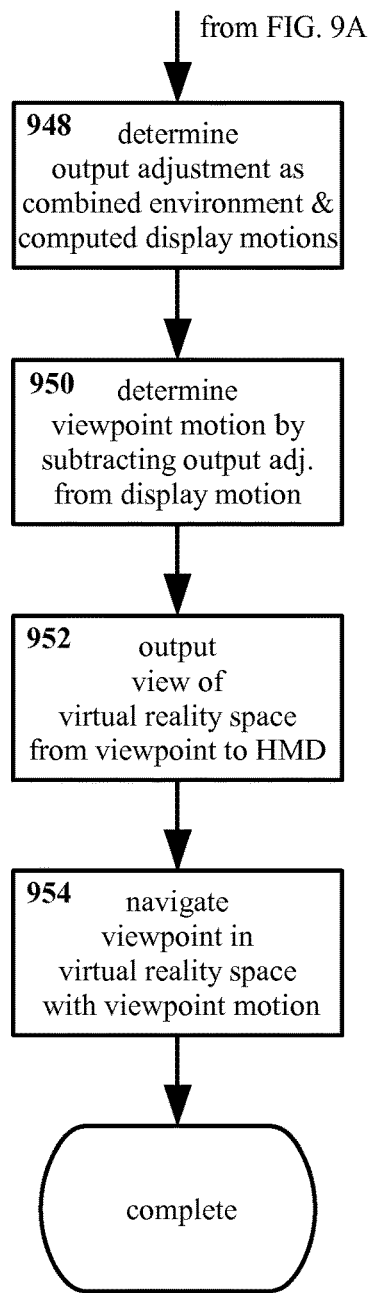

Turning to FIG. 9A and FIG. 9B, an arrangement at least somewhat similar to that in FIG. 8A and FIG. 8B is shown, but considering computed motion terms in combination with sensed motions.

In FIG. 9A, a virtual reality space is generated 942 in the processor of an HMD. A display motion is established 944; establishing the display motion 944 may be considered as several sub steps, namely sensing 944A the display motion with a display sensor in/on the HMD, and communicating 944B that display motion to the processor in the HMD.

In addition, as noted elsewhere herein, certain motions and/or modifications to existing motions may be determined computationally. For example in the arrangement shown in FIG. 9A, a term for the display motion is determined computationally 944C in the processor of the HMD (typically though not necessarily through the use of executable instructions and/or data instantiated on the processor). This term might represent features such as motion of the HMD and/or the wearer thereof that is produced not necessarily as intentional motion, but e.g. in response to motion of the environment. For example, a wearable device on some lever arm (e.g. the neck and head for an HMD, but also an arm for a smart watch or similar device, a leg for a smart shoe, and so forth) might exhibit induced motions caused by the motion of a vehicle that the wearer is in, but not necessarily corresponding precisely with the motion of that vehicle. As a more concrete example, air turbulence, road noise, etc. may be considered a form of vehicle motion for at least certain embodiments. Such air turbulence, road noise, etc. may induce motions of a wearer's head, and thus of an HMD worn thereon, that may be different in magnitude, direction, and so forth than the air turbulence motion, road noise motion, etc. itself. However, if the environment sensor(s) for sensing the motion of the vehicle are disposed on the vehicle, those induced motions may not be measured by environment sensor(s). Despite this, if sufficient information is available—e.g. the approximate geometry of a human being, a chair upon which he or she is sitting in the vehicle, etc.—then the induced motions may be determined computationally, in whole or in part, with at least some degree of accuracy. Thus, in the example of FIG. 9A, a computational term may be included in the display motion, in addition to or in place of any sensed and/or received HMD motions.

Continuing in FIG. 9A, environment motions are established 946, again potentially being considered as several sub steps. The presence of the HMD within the vehicle may be sensed 946A with a presence sensor in the vehicle. That presence then may be communicated 946B to the processor in the HMD. A motion of the vehicle in which the HMD is disposed may be sensed 946C with an environment sensor in and/or on the vehicle. That motion of the vehicle then may be communicated 946D to the processor in the HMD.

In addition, as with display motion, certain motions and/or modifications to environment motions may be determined computationally. For example in the arrangement shown in FIG. 9A, a term for the environment motion is determined computationally 946E in the processor in the HMD (typically though not necessarily through the use of executable instructions and/or data instantiated on the processor). This term might represent features such as damping due to shock absorption in a seat in which the viewer is disposed, damping from the viewer's own body, etc. As noted with regard to induced motions in sub step 944C, damping may not necessarily be measurable directly via a sensor on the vehicle (or other environment), but may be calculated with at least some degree of accuracy from vehicle motions that are so sensed (again possibly utilizing information regarding the viewer's body, the seat in which he or she is disposed within the vehicle, etc.).

In some sense the computational determination of a damping term as in the example sub step of 946E might also be considered to be a sub step of step 944. That is, the damping of a vehicle's motion as experienced by a viewer and HMD may reasonably be considered to affect the motion of the HMD, rather than the motion of the vehicle. However, the present invention is not particularly limited with regard to how such determinations are carried out, and precisely how motions are "grouped" for consideration may vary considerably from one embodiment to another. Likewise, the particular computations used (both for computationally determined motion and for other steps herein) also may vary, and the present invention is not particularly limited with regard thereto.

It is noted that a damping may in some sense be considered to represent negative motion; that is, damping is may be reduction in some other motion, rather than a motion unto itself. Consideration of such negative motions is not necessarily required for any particular embodiment of the present invention, but also is not excluded. Likewise, other computational approaches may be equally suitable.

Furthermore, the present invention is not limited only to computational determination of modifications to or terms related to other motions, such as the induced terms described with regard to sub step 944C or the damping terms described with regard to sub step 946E. Computational determination of various movements may be suitable regardless of the particulars thereof, and the present invention is not particularly limited with regard thereto. For example, at least certain motions, including but not limited to air turbulence, road noise, "rough water", an uneven gait (e.g. while on horseback), and so forth may be modeled computationally, regardless of whether related motions are received and/or sensed directly.

Now with reference to FIG. 9B, an output adjustment is determined 948 as a combination of the sensed environment motion and the computed damping term, determined in sub steps 946C and 946E respectively, along with the computed induced term, determined in sub step 944C. (It is emphasized that even though the induced motion term from sub step 944C is, or at least may be considered as, an aspect of display motion, nevertheless the induced motion term may be included and/or considered in determining the output adjustment. The present invention is not particularly limited with regard to what motions and/or other factors may be so considered.) The viewpoint motion is determined 950 by subtracting the output adjustment from the display motion of the HMD. A view of the virtual reality space from the viewpoint is outputted 952 to the HMD, and the viewpoint is navigated 954 within the virtual reality space at least substantially in accordance with the viewpoint motion.

Figure 10:
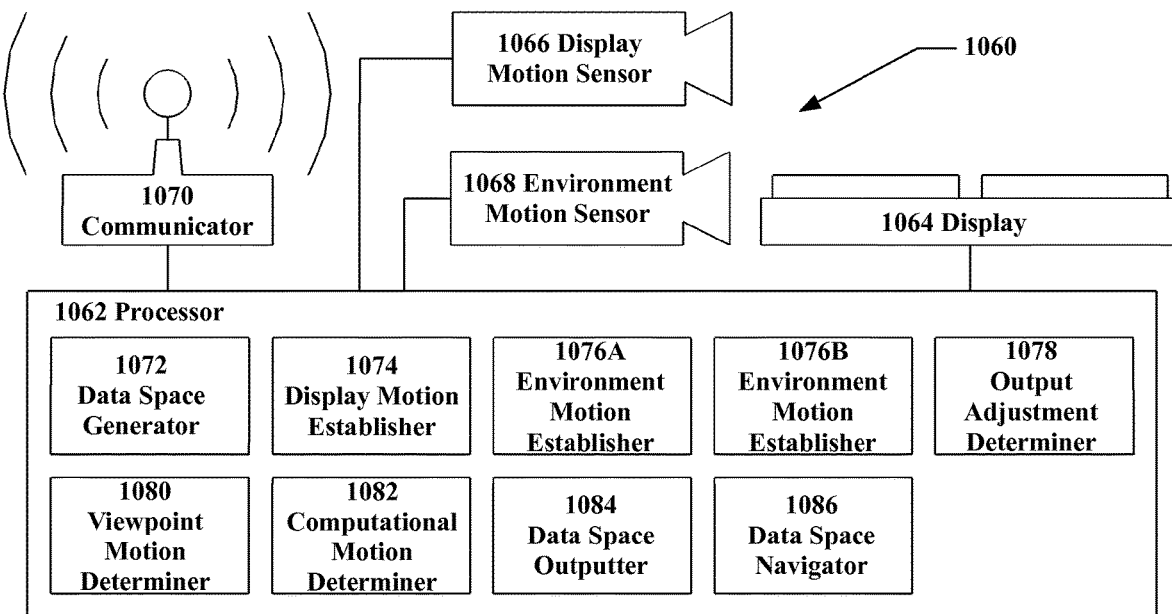
FIG. 10 shows an example arrangement of an apparatus for adjusting motion-based data space manipulation according to the present invention, in schematic form.

Now with reference to FIG. 10, a schematic diagram of an embodiment of an apparatus 1060, in the example shown having the configuration of a display such as a head mounted display, for adjusting motion-based data space manipulation is shown therein.

The apparatus 1060 includes a processor 1062 adapted for executing executable instructions. The invention is not particularly limited with regard to the choice of processor 1062. Suitable data processors 1062 include but are not limited to digital electronic microprocessors. Although the processor 1062 is referred to in at least some places herein as a self-contained physical device for purposes of clarity, this is not required, and other arrangements may be suitable. For example, the processor 1062 may constitute two or more physical processors working cooperatively, a processing capability in a network without a well-defined physical form, etc.

The apparatus 1060 also includes a display 1064 in communication with the processor 1062. The display 1064 is adapted to output one or more data spaces or at least a portion thereof, so as to be sensed by a viewer. The display 1064 may for example output some or all of an augmented reality environment and/or a virtual reality environment, e.g. as imagery to a user. However, this is an example only, and other arrangements may be equally suitable.

As illustrated, the display 1064 is a stereo display, with left and right screens adapted to output to the left and right eyes of a viewer. However this also is an example only. The present invention is not particularly limited with regard to the type of display 1064. Typically, although not necessarily, the display 1064 may be a visual display. A range of devices may be suitable for use as the display 1064, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, as noted the present invention is not limited only to the use of visual displays as a display 1064.

Still with reference to FIG. 7, the apparatus 1060 includes at least one of a display motion sensor 1066 and a communicator 1070, and at least one of an environment motion sensor 1068 and a communicator 1070. Thus the apparatus 1060 may include one or more display motion sensors 1066 and environment motion sensors 1068, one or more display motion sensors 1066 or environment motion sensors 1068 and a communicator 1070, and/or only a communicator 1070. (For example, through the use of a communicator only, information regarding all motions of concern may be received in the processor 1062, even if the apparatus 1060 itself has no sensors thereon. Likewise, executable instructions and/or data might be supplied to enable all motions of concern to be determined computationally.) Although the example arrangement shown in FIG. 10 illustrates all three of a display motion sensor 1066, an environment motion sensor 1068, and a communicator 1070, and embodiments of the present invention may include all three, not all embodiments will necessarily include all three.

The display motion sensor 1066 is a sensor in communication with the processor 1062 and adapted to sense motion of the display 1064, e.g. translation, rotation, etc. Typically though not necessarily, for arrangements wherein some or all elements of the apparatus 1060 are integrated into a single structure, the motion of the display 1064 also may be or at least may approximate the motion of the apparatus 1060 as a whole, and/or the motion of a viewer (not shown) utilizing the apparatus 1060. Thus it may be suitable for certain embodiments for a display motion sensor 1066 to sense a motion of (for example) the processor 1062, or some other element of the apparatus 1060, or to sense a motion of a viewer, etc., rather than necessarily directly sensing motion of the display 1064, with the motion of the display 1064 then being computed and/or inferred therefrom (e.g. if a processor and a display are rigidly engaged, motion of the display may be determinable from motion of the processor).

Again typically though not necessarily, the display motion sensor 1066 may be disposed on and/or substantially rigidly engaged with the display 1064. For certain display motion sensors 1066, including but not limited to accelerometers and gyroscopes, this may facilitate convenient determination of the motion of the display 1064. However, other arrangements may be equally suitable. Notably, sensors distant from the display, such as imagers viewing the apparatus from some distance, may serve as display motion sensors 1066.

The present invention is neither limited with regard to what sensors may serve as display motion sensors 1066, nor limited in how motion may be sensed. Suitable display motion sensors 1066 include but are not limited to accelerometers, gyroscopes, GPS sensors, magnetometers, imagers, depth sensors, structured light sensors, time-of-flight sensors, ultrasonic sensors, and wireless signal triangulation sensors.

Again with reference to FIG. 10, the environment motion sensor 1068 is a sensor in communication with the processor 1062 and adapted to sense motion of an environment in which the display 1064 is disposed, e.g. translation, rotation, etc.

As shown, the environment motion sensor 1068 is directly connected with the processor 1062, however this is an example only. Other arrangements may be equally suitable, including but not limited to arrangements wherein the environment motion sensor 1068 is not part of the apparatus 1060 at all, and/or wherein the environment motion sensor 1068 is physically distant from the apparatus 1060. For example, a vehicle such as an automobile might have an accelerometer and gyroscope physically or otherwise engaged therewith serving as environment motion sensors 1068, so as to move with the vehicle and sense motion of the vehicle therefrom, with the accelerometer and gyroscope then transmitting their data to the apparatus 1060 (e.g. to be received by the communicator 1070). In such arrangement such an accelerometer and gyroscope may or may not be considered to be part of the apparatus 1060 proper, even if they support certain functions of the apparatus.

The present invention is not particularly limited with regard to what sensors may serve as environment motion sensor 1068, nor with how motion may be sensed. Suitable environment motion sensor 1068 include but are not limited to accelerometers, gyroscopes, GPS sensors, magnetometers, imagers, depth sensors, structured light sensors, time-of-flight sensors, ultrasonic sensors, and wireless signal triangulation sensors.

Although the display motion sensor 1066 and environment sensor 1068 are shown as distinct elements in FIG. 10, for certain embodiments a single physical sensor may serve as both a display motion sensor 1066 and an environment sensor 1068.

Still with reference to FIG. 10, the communicator 1070 is adapted to receive incoming information regarding display motion and/or environment motion. Typically, though not necessarily, a communicator 1070 may be present if one or both of the display motion sensor 1066 and environment sensor 1068 are absent.

The present invention is not particularly limited with regard to the communicator 1070. Typically though not necessarily a communicator 1070 may be a wireless communicator, such as a Wi-Fi or Bluetooth communicator, but other arrangements may be equally suitable. In particular, although for at least certain embodiments only data reception may be utilized and thus a receiver with no transmission capabilities may serve as a communicator 1070, the present invention does not exclude a transceiver or other communicator capable of transmitting from serving as a communicator 1070.

As noted elsewhere, the present invention may incorporate addition elements besides those shown, including but not limited to a distinct presence sensor adapted to determine whether an apparatus according to the present invention is present in a given environment. However, as also noted, individual sensors may perform multiple tasks, thus, the display motion sensor 1060, the environment sensor 1068, and/or the communicator 1070 may perform some or all functions of a presence sensor.

The apparatus 1060 includes several elements shown to be instantiated on the processor 1062. The aforementioned elements include a data space generator 1072, a display motion establisher 1074, two environment motion establishers 1076A and 1076B, an output adjustment determiner 1078, a viewpoint motion determiner 780, a damping term determiner 1082, a data space outputter 1084, and a data space navigator 1086.

Typically the data space generator 1072, display motion establisher 1074, environment motion establishers 1076A and 1076B, output adjustment determiner 1078, viewpoint motion determiner 1080, damping term determiner 1082, data space outputter 1082, and data space navigator 1086, include executable instructions and/or data, e.g. instantiated on the processor 1062. In at least some embodiments the data space generator 1072, display motion establisher 1074, environment motion establishers 1076A and 1076B, output adjustment determiner 1078, viewpoint motion determiner 1080, damping term determiner 1082, data space outputter 1082, and data space navigator 1086 may be composed exclusively of executable instructions and/or data. This is an example only, however, for purposes of clarity for the example embodiment shown in FIG. 10, data space generator 1072, display motion establisher 1074, environment motion establishers 1076A and 1076B, output adjustment determiner 1078, viewpoint motion determiner 1080, damping term determiner 1082, data space outputter 1082, and data space navigator 1086 will be referred to in at least some places herein as being composed of executable instructions and/or data instantiated on the processor 1062.

It is noted further that although the data space generator 1072, display motion establisher 1074, environment motion establishers 1076A and 1076B, output adjustment determiner 1078, viewpoint motion determiner 1080, damping term determiner 1082, data space outputter 1082, and data space navigator 1086 are shown and described herein as being separate elements, this is done for clarity and should not be taken to limit the present invention. For at least some embodiments, one or more of the data space generator 1072, display motion establisher 1074, environment motion establishers 1076A and 1076B, output adjustment determiner 1078, viewpoint motion determiner 1080, damping term determiner 1082, data space outputter 1082, and data space navigator 1086 may be combined with one another, and/or may be incorporated into some larger construct, e.g. a single program performing all functions thereof, a general operating system, etc.

Furthermore, any or all of the data space generator 1072, display motion establisher 1074, environment motion establishers 1076A and 1076B, output adjustment determiner 1078, viewpoint motion determiner 1080, damping term determiner 1082, data space outputter 1082, and data space navigator 1086 may be subdivided. For example, as shown in FIG. 7 two environment motion establishers 1076A and 1076B are shown. As has been previously noted, for at least some embodiments of the present invention multiple environment motions may be established; for such embodiments, individual elements (e.g. executable instructions instantiated on the processor 1062) may address each such environment motion. Likewise, although not shown in FIG. 10, individual elements may address multiple display motions, output adjustments, etc.

Additionally, not all elements shown in FIG. 10 necessarily must or will be present in all embodiments, and elements not shown may be present. For example an arrangement having a presence sensor, and/or wherein another sensor functions as a presence sensor, the processor might include a presence determiner composed of data and/or executable instructions instantiated thereon. Conversely, an embodiment that does not consider damping terms may exclude the damping term determiner 1082.

In the arrangement of FIG. 10, the data space generator 1072 is adapted to generate a data space. For example, a data space might be created, controlled, etc., in the form of a three dimensional virtual reality and/or augmented reality environment. Data spaces have been described earlier herein.

The display motion establisher 1074 is adapted to establish a display motion, display motion having previously been described herein. The display motion establisher 1074 typically utilizes information received from the display motion sensors 1066 (where present) and/or the receiver 1070 (where present). For example, a display motion establisher 1074 might receive accelerometer and gyroscope outputs, images from an image sensor, etc. and determine the display motion therefrom.

The environment motion establishers 1076A and 1076B (or for other embodiments a single environment motion establisher 1076) are adapted to establish an environment motion, environment motion also having previously been described herein. The environment motion establishers 1076A and 1076B typically utilize information received from the environment motion sensor 1068 (where present) and/or the receiver 1070 (where present). For example, an environment motion establisher 1076A or 1076B might receive accelerometer and gyroscope outputs, images from an image sensor, etc. and determine the display motion therefrom.

The output adjustment determiner 1078 determines an adjustment for the motion as will be considered for output, based on the display motion and/or environment motion as established by the display motion establisher 1074 and environment motion establishers 1076A and 1076B. Output adjustment has been previously described herein. Typically though not necessarily, the output adjustment determiner may compute suitable output adjustments based on motions as communicated from the display motion establisher 1074 and environment motion establishers 1076A.

Still with reference to FIG. 10, the viewpoint motion determiner 1080 determines a motion, if any, as to be applied to a point of view of the data space. Viewpoint motion and determination thereof have been described previously herein. Typically the viewpoint motion may be determined substantially as the display motion established by the display motion establisher 1074 as adjusted by the output adjustment determined by the output adjustment determiner 1078, though other arrangements may be equally suitable.

The damping term determiner determines damping terms to be applied to environment motions (and/or display motions), when one or more damping terms or other motions are determined computationally in addition to or in place of being sensed. Damping motions have been previously described herein. Although description of computationally determined motions herein have principally addressed examples of damping terms, for other embodiments the damping term determiner 1082 shown in FIG. 10 might reasonably be considered more generally to be a "computational motion determiner".

The outputter 1084 outputs some or all of the data space to the display 1064, and typically though not necessarily to a viewer thereof (not shown in FIG. 10). Output of the data space typically includes motions of the point of view of the data space as determined by the viewpoint motion determiner 1080. Output of the data space has been described previously herein.

The data space navigator 1086 navigates the viewpoint within the data space. This may include one or both of changing what is or is to be outputted to the display 1064 as the viewpoint moves within the data space, and/or features such as tracking (e.g. mathematically) where the viewpoint is within the data space for processing purposes, control purposes, etc. Data space navigation of the viewpoint has been previously described herein.

Figure 11:
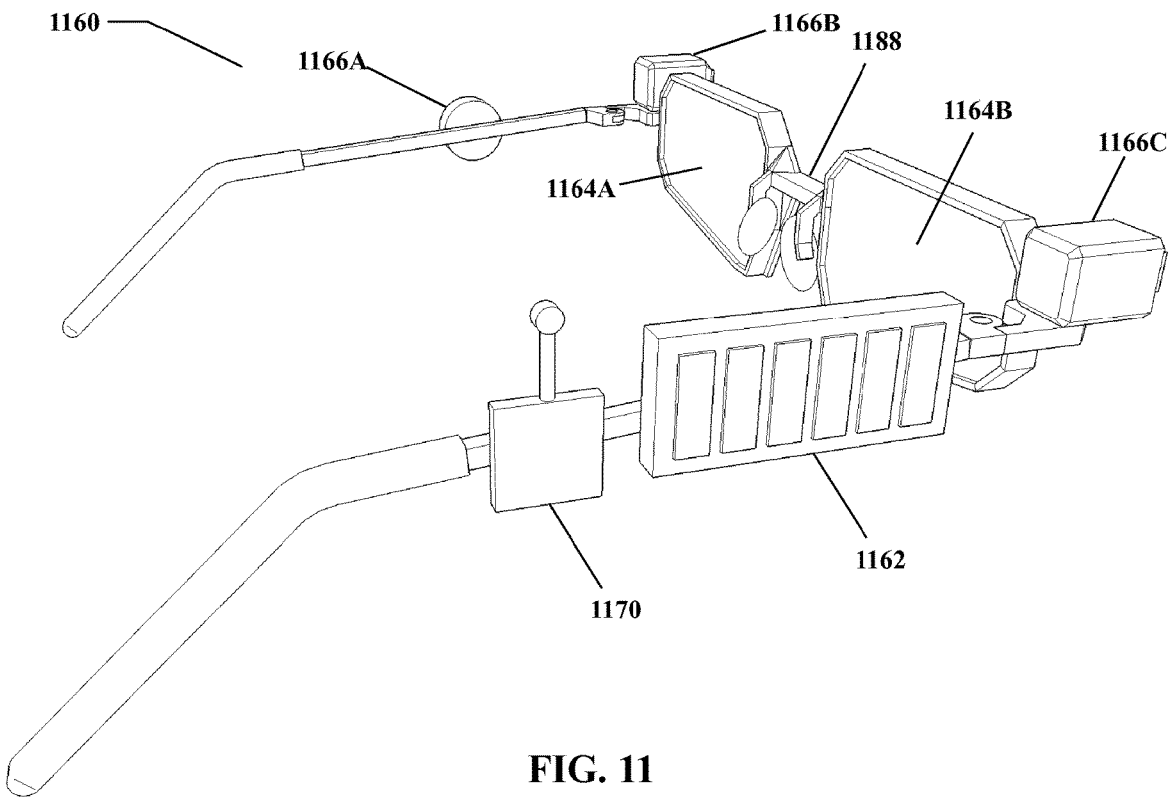
FIG. 11 shows a perspective view of an example apparatus for adjusting motion-based data space manipulation according to the present invention.

Turning now to FIG. 11, the present invention is not particularly limited with regard to form, and may be disposed on and/or incorporated into many shapes and/or other devices. Suitable configurations include but are not limited to the example shown in FIG. 11, wherein the present invention is illustrated in the form of a head mounted display resembling a pair of glasses.

As shown in FIG. 11, the example embodiment of the apparatus 1160 therein includes a body 1188 having a form similar to a pair of glasses, and adapted to be worn in a similar fashion. A processor 1162 adapted for executing executable instructions is disposed on the body 1184. Although not visible as distinct entities, the processor 1162 may support thereon a data space generator, display motion establisher, environment motion establisher, output adjustment determiner, viewpoint motion determiner, damping term determiner, outputter, and/or data space navigator, e.g. in the form of executable instructions and/or data instantiated on the processor 1162.

The apparatus 1160 also includes display motion sensors 1166A, 1166B, and 1166C disposed on the body 1184, illustrated in FIG. 11 as an accelerometer/gyroscope 1166A and imagers 1166B and 1166C in a stereo configuration, though these are examples only. The apparatus 1160 further includes a communicator 1170 disposed on the body 1184. As has been noted, not all embodiments require all of a display motion sensor, an environment motion sensor, and a receiver, and the arrangement shown in FIG. 8 illustrates this point, in that no environment motion sensor is shown. An environment motion sensor might be incorporated into a vehicle in which a wearer of the apparatus 1160 is anticipated to ride, for example, with environment motion data then being received by the communicator 1170; in such instance the vehicle sensor(s) would not necessarily be considered part of the apparatus (though they are not necessarily excluded therefrom, and for at least certain embodiments might indeed be considered part of an apparatus according to the present invention even if physically distal from the remainder of the apparatus).

Still with reference to FIG. 11, the apparatus 1160 includes a display 1164A and 1164B disposed on the body 1184, illustrated as left and right visual displays in a stereo configuration.

It is noted that in the arrangement shown, the body 1184 is configured and display motion sensors 1166B and 1166C are disposed thereon such that when the body 884 is worn by a viewer, display motion sensors 1166B and 1166C would be substantially aligned with the lines of sight of the viewer's eyes, and could potentially encompass fields of view at least somewhat comparable to those of the viewer's eyes, assuming display motion sensors 1166B and 1166C with fields of view similar in extent to those of the viewer. Similarly, in the arrangement shown the body 1184 is configured and the display 1164A and 1164B disposed thereon such that when the body 1184 is worn by a viewer, the display 1164A and 1164B would be proximate to and substantially in front of the viewer's eyes.

However, it is emphasized that the arrangement in FIG. 11 is an example only, and that other arrangements may be equally suitable.

Figure 12:
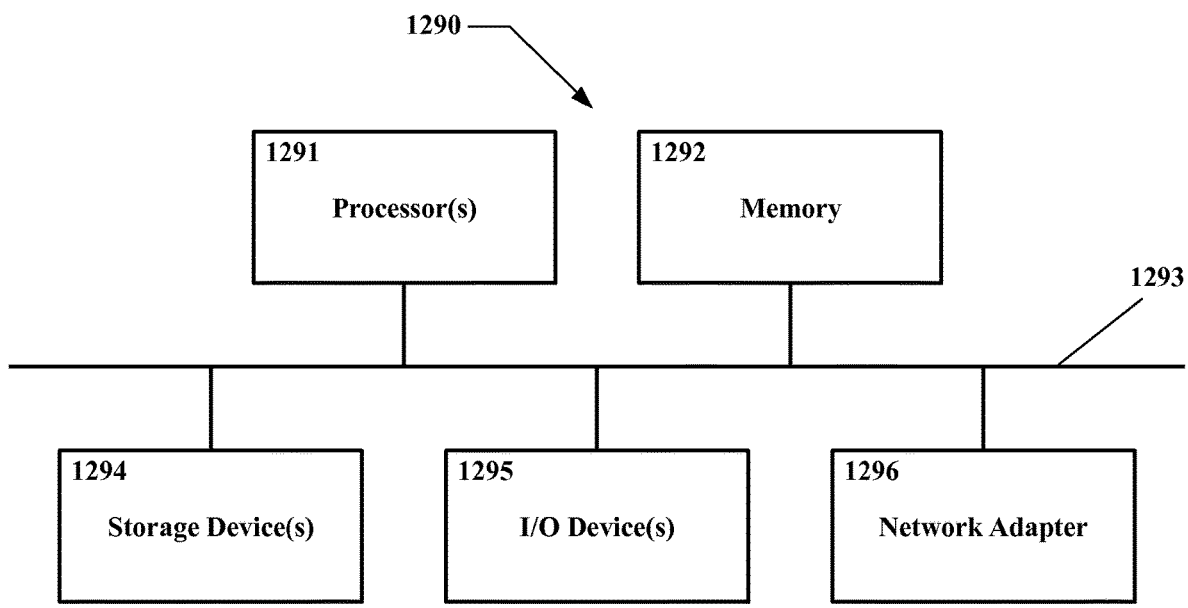
FIG. 12 shows a block diagram of a processing system that may implement operations of the present invention.

FIG. 12 is a block diagram of an apparatus that may perform various operations, and store various information generated and/or used by such operations, according to an embodiment of the disclosed technique. The apparatus may represent any computer or processing system described herein. The processing system 1290 is a hardware device on which any of the other entities, components, or services depicted in the examples of FIG. 1 through FIG. 11 (and any other components described in this specification) may be implemented. The processing system 1290 includes one or more processors 1291 and memory 1292 coupled to an interconnect 1293. The interconnect 1293 is shown in FIG. 12 as an abstraction that represents any one or more separate physical buses, point to point connections, or both connected by appropriate bridges, adapters, or controllers. The interconnect 1293, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1291 is/are the central processing unit of the processing system 1290 and, thus, control the overall operation of the processing system 600. In certain embodiments, the processor(s) 1291 accomplish this by executing software or firmware stored in memory 1292. The processor(s) 1291 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1292 is or includes the main memory of the processing system 1290. The memory 1292 represents any form of random access memory (RAM), read-only memory (ROM), flash memory, or the like, or a combination of such devices. In use, the memory 1292 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network storage adapter 1294, a storage device(s) 1295, and I/O device(s) 1296, are also connected to the processor(s) 1291 through the interconnect 1293 The network adapter 1294 provides the processing system 1290 with the ability to communicate with remote devices over a network and may be, for example, an Ethernet adapter or Fibre Channel adapter. The network adapter 1294 may also provide the processing system 1290 with the ability to communicate with other computers within the cluster. In some embodiments, the processing system 1290 may use more than one network adapter to deal with the communications within and outside of the cluster separately.

The I/O device(s) 1296 can include, for example, a keyboard, a mouse or other pointing device, disk drives, printers, a scanner, and other input and/or output devices, including a display device. The I/O device(s) 1296 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 1292 may be implemented as software and/or firmware to program the processor(s) 1291 to carry out actions described herein. In certain embodiments, such software or firmware may be initially provided to the processing system 1290 by downloading from a remote system through the processing system 1290 (e.g., via network adapter 1294).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 1295 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method, comprising:
   generating, by a processor of a moveable display, an augmented reality space comprising a portion of a physical world space and a virtual reality object within the physical world space, wherein:
   the physical world space is a portion of the physical world within view of a viewer; and
   the viewer is located within a vehicle;
   establishing, by the processor of the moveable display, a display motion of the moveable display within the physical world space, wherein the display motion comprises a set of motions of the moveable display in the physical world space;
   establishing, by the processor, an environment motion of the moveable display in the physical world space, wherein the environment motion is a subset of the display motion designated to be excluded from affecting display of the virtual reality space;
   sensing, by a first sensor, a movement of a moveable display within the physical world space;
   generating, by the processor, a data set representative of the display motion of the moveable display within the physical world space;
   in response to receiving from a presence sensor or a processing device of the vehicle a notification at the processor of the moveable display that indicates the moveable display is present in the vehicle:
   determining, by the processor, a first subset of data of the display motion indicative of the viewer moving the display within the vehicle from a first location within the vehicle to a second location within the vehicle, wherein the first subset of data is indicative of intentional movement of the view within the vehicle;
   determining, by the processor, a second subset of data of the data set directly indicative of movement of the vehicle within the physical world;
   determining, by the processor, that the second subset of data of the data set is the environment motion, wherein the second subset of data of the data set indicates that the vehicle moved from a first location in the physical world space to a second location within the physical world space;
   in response to the vehicle moving from the first location to the second location in the physical world space, removing, by the processor, the second subset of data from the data set to obtain an updated data set; and
   adjusting at least a portion of the virtual reality object as displayed in the physical world space in view of the updated data set; and
   in response to not receiving the notification that the moveable display is present in the vehicle, retaining the environment motion with the display motion.

2. The method of claim 1, wherein the augmented reality space is a three dimensional augmented reality space.

3. The method of claim 1, wherein the movement of the moveable display comprises at least one of a translation movement of the moveable display or a rotation movement of the moveable display.

4. The method of claim 1, wherein the movement of the vehicle within the physical world space induces the movement of the moveable display within the vehicle.

5. The method of claim 1, wherein:
   the first sensor senses the movement of the moveable display within the vehicle; and
   a second sensor senses the movement of the vehicle with the physical world space.

6. The method of claim 1, wherein determining the second subset of data comprises computationally determining the movement of the vehicle within the physical world space based on at least one of a velocity of the movement, an acceleration of the movement, a direction of the movement, or an angle of the movement.

7. The method of claim 6, further comprising determining a dampening of a perception by the viewer of the movement of the physical world space based on a negative motion of part of the vehicle.

8. The method of claim 7, wherein the negative motion substantially corresponds with a damped harmonic motion of the movement of the physical world space by the vehicle.

9. The method of claim 1, further comprising:
   determining a negative motion of the vehicle that changes a viewer's perception of the physical world space; and
   removing a third subset of data from the data set corresponding to the movement of the physical world space that is changed by the negative motion.

10. The method of claim 1, wherein the second subset of data comprises a plurality of movements of the physical world space.

11. An apparatus, comprising:
    a processor;
    a display;
    a display motion sensor; and
    an environment motion sensor, wherein the processor is configured to:

generate an augmented reality space comprising a portion of a physical world space and a virtual reality object within the physical world space, wherein:
  the physical world space is a portion of a physical world within view of a viewer; and
  the viewer is located within a vehicle;
receive a first data set from the display motion sensor, the first data set representative of a movement of the display within the vehicle from a first location within the vehicle to a second location within the vehicle, wherein the first data set is indicative of intentional movement of the viewer within the vehicle;
receive a second data set from the environment motion sensor, the second data set directly representative of a movement of the vehicle within the physical world space;
in response to receiving from a presence sensor or a processing device of the vehicle a notification that indicates the display is present in the vehicle:
  determine the second data set indicates that the vehicle moved from a first location in the physical world space to a second location within the physical world space;
  in response to the vehicle moving from the first location to the second location in the physical world space, remove the second data set to obtain an updated data set; and
  adjust at least a portion of the virtual reality object as displayed in the physical world space in view of the updated data set; and
in response to not receiving the notification that the display is present in the vehicle, retain the second data set with the first data set.

12. The apparatus according to claim 11, wherein the processor is further to receive a third data set representative of a negative motion of the vehicle that changes a viewer's perception of the physical world space.

13. The apparatus of claim 12, wherein the negative motion counteracts a portion of the movement of the physical world space.

14. The apparatus of claim 11, wherein the processor, the display, the display motion sensor, and the environment motion sensor are physically integrated as a wearable device.

15. The apparatus of claim 11, wherein the display motion sensor is physically distal from the display.

16. The apparatus of claim 11, wherein the environment motion sensor is physically distal from the display.

17. The apparatus of claim 11, wherein the display motion sensor comprises at least one of an accelerometer, a gyroscope, a GPS sensor, a magnetometer, an imager, a depth sensor, a structured light sensor, a time-of-flight sensor, an ultrasonic sensor, or a wireless signal triangulation sensor.

18. The apparatus of claim 11, wherein the environment motion sensor comprises at least one of an accelerometer, a gyroscope, a GPS sensor, a magnetometer, an imager, a depth sensor, a structured light sensor, a time-of-flight sensor, an ultrasonic sensor, or a wireless signal triangulation sensor.

19. An apparatus, comprising:
a display;
a first sensor and a second sensor;
a processor coupled to the display, the first sensor, and the second sensor, wherein the processor is configured to:
  generate the augmented reality space comprising a portion of a physical world space and a virtual reality object within the physical world space, wherein:
    the physical world space is a portion of a physical world within view of a viewer; and
    the viewer is located within a vehicle;
  receive a first data set from the first sensor, wherein the first data set is representative of a movement of the display within the vehicle from a first location within the vehicle to a second location within the vehicle, wherein the first data set is indicative of intentional movement of the viewer within the vehicle;
  receive a second data set from the second sensor, the second data set directly representative of a movement of the vehicle within the physical world space;
  in response to receiving from a presence sensor or a processing device of the vehicle a notification that indicates the display is present in the vehicle, determine the second data set indicates that the vehicle moved from a first location in the physical world space to a second location within the physical world space;
  in response to the vehicle moving from the first location to the second location in the physical world space, display at least a portion of the virtual reality object as displayed in the physical world space based only on the first data set; and
  in response to not receiving the notification that the display is present in the vehicle, display at least a portion of the virtual reality object as displayed in the physical world space based on the first data set and the second data set.

* * * * *